(12) United States Patent
Yachide et al.

(10) Patent No.: US 11,699,067 B2
(45) Date of Patent: Jul. 11, 2023

(54) ARITHMETIC PROCESSING APPARATUS AND CONTROL METHOD THEREFOR

(71) Applicant: CANON KABUSHIKI KAISHA, Tokyo (JP)

(72) Inventors: Yusuke Yachide, Tokyo (JP); Masami Kato, Sagamihara (JP); Yoshinori Ito, Tokyo (JP); Takahisa Yamamoto, Kawasaki (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 896 days.

(21) Appl. No.: 15/908,945

(22) Filed: Mar. 1, 2018

(65) Prior Publication Data
US 2018/0253641 A1 Sep. 6, 2018

(30) Foreign Application Priority Data

Mar. 3, 2017 (JP) .................................. 2017-040919

(51) Int. Cl.
*G06N 3/06* (2006.01)
*G06N 3/063* (2023.01)
(Continued)

(52) U.S. Cl.
CPC .............. *G06N 3/063* (2013.01); *G06N 3/04* (2013.01); *G06N 3/045* (2023.01)

(58) Field of Classification Search
CPC ........ G06N 3/063; G06N 3/04; G06N 3/0454; G06N 382/155; G06N 382/156; G06N 382/157; G06N 382/158
See application file for complete search history.

(56) References Cited

U.S. PATENT DOCUMENTS 6,549,982 B1 * 4/2003 Yamanaka ............ G06F 3/0613
 711/1
7,937,346 B2 * 5/2011 Kato ........................ G06N 3/08
 706/27

(Continued)

FOREIGN PATENT DOCUMENTS

JP 2003228364 A * 8/2003
JP 2004333619 A * 11/2004

(Continued)

OTHER PUBLICATIONS

Hwang et al. "A Low-Complexity Embedded Compression Codec Design With Rate Control for High-Definition Video", IEEE CSVT, Apr. 2015, pp. 674-687.*

(Continued)

*Primary Examiner* — Li Wu Chang
(74) *Attorney, Agent, or Firm* — Rossi, Kimms & McDowell LLP

(57) ABSTRACT

To allow arithmetic processing using a plurality of processing nodes to be executed with a smaller memory size, an arithmetic processing apparatus for executing processing using a hierarchical type network formed by the plurality of processing nodes, comprises: a storage unit configured to store a parameter used by each of the plurality of processing nodes for arithmetic processing and a calculation result of the arithmetic processing in each of the plurality of processing nodes; and a buffer control unit configured to switch, based on a configuration of the hierarchical type network, a buffer system of the parameter and the calculation result in the storage unit in at least one layer of the hierarchical type network.

14 Claims, 19 Drawing Sheets

(51) Int. Cl.
  *G06N 3/04*   (2023.01)
  *G06N 3/045*  (2023.01)

(56) References Cited

U.S. PATENT DOCUMENTS

| | | | |
|---|---|---|---|
| 8,385,631 B2 * | 2/2013 | Yamamoto | G06N 3/08 |
| | | | 382/156 |
| 8,391,306 B2 * | 3/2013 | Ito | G06K 9/4628 |
| | | | 370/412 |
| 9,064,324 B2 | 6/2015 | Ooguni | |
| 9,202,541 B2 | 12/2015 | Senou | |

FOREIGN PATENT DOCUMENTS

| | | | |
|---|---|---|---|
| JP | 2009080693 A | 4/2009 |
| JP | 2009105695 A | 5/2009 |
| JP | 5171118 B2 | 3/2013 |
| JP | 2013058277 A | 3/2013 |
| JP | 5184824 B2 | 4/2013 |
| JP | 2013214151 A | 10/2013 |
| JP | 5368687 B2 | 12/2013 |

OTHER PUBLICATIONS

Hawkes "Video Scene Coherence, Frame Buffers, and Line Buffers", XAPP296 (v1.0) May 21, 2002, pp. 11.*
Office Action issued in Japanese Appln. No. 2017-040919 dated Feb. 22, 2021.

* cited by examiner

FIG. 10A

| SEQUENCE NUMBER | INPUT FEATURE PLANE NUMBER | OUTPUT FEATURE PLANE NUMBER | PROCESSING LINE | WEIGHTING COEFFICIENT NUMBER | CALCULATION TYPE | FILTER WIDTH | FILTER HEIGHT |
|---|---|---|---|---|---|---|---|
| 1 | 0 | 1 | 1 | 1 | 1 | 3 | 3 |
| 2 | 0 | 2 | 1 | 2 | 1 | 3 | 3 |
| 3 | 0 | 3 | 1 | 3 | 1 | 3 | 3 |
| 4 | 0 | 1 | 2 | 1 | 1 | 3 | 3 |
| 5 | 0 | 2 | 2 | 2 | 1 | 3 | 3 |
| 6 | 0 | 3 | 2 | 3 | 1 | 3 | 3 |
| ... | ... | ... | ... | ... | ... | ... | ... |
| 19 | 1 | 4 | 2 | 4 | 1 | 3 | 3 |
| 20 | 2 | 4 | 2 | 6 | 1 | 3 | 3 |
| 21 | 3 | 4 | 1 | 8 | 1 | 3 | 3 |
| 22 | 1 | 5 | 5 | 5 | 1 | 3 | 3 |
| 23 | 2 | 5 | 6 | 7 | 1 | 3 | 3 |
| 24 | 3 | 5 | 3 | 9 | 1 | 3 | 3 |
| 25 | 0 | 1 | 5 | 1 | 1 | 3 | 3 |
| 26 | 0 | 2 | 6 | 2 | 1 | 3 | 3 |
| 27 | 0 | 3 | 7 | 3 | 1 | 3 | 3 |
| ... | ... | ... | ... | ... | ... | ... | ... |
| 31 | 1 | 5 | 3 | 5 | 1 | 3 | 3 |
| 32 | 2 | 5 | 3 | 7 | 1 | 3 | 3 |
| 33 | 3 | 5 | 3 | 9 | 1 | 3 | 3 |
| 34 | 6 | 4 | 1 | 10 | 1 | 3 | 3 |
| 35 | 6 | 5 | 1 | 12 | 1 | 3 | 3 |
| 36 | 7 | 4 | 1 | 11 | 1 | 3 | 3 |
| 37 | 7 | 5 | 1 | 13 | 1 | 3 | 3 |
| ... | ... | ... | ... | ... | ... | ... | ... |

FIG. 10B

| SEQUENCE NUMBER | INPUT FEATURE PLANE NUMBER | OUTPUT FEATURE PLANE NUMBER | PROCESSING LINE | WEIGHTING COEFFICIENT NUMBER | CALCULATION TYPE | FILTER WIDTH | FILTER HEIGHT |
|---|---|---|---|---|---|---|---|
| 1 | 0 | 1 | 1 | 1 | 1 | 3 | 3 |
| 2 | 0 | 1 | 2 | 1 | 1 | 3 | 3 |
| 3 | 0 | 1 | 3 | 1 | 1 | 3 | 3 |
| 4 | 0 | 1 | 4 | 1 | 1 | 3 | 3 |
| . | . | . | . | . | . | . | . |
| N-1 | 0 | 1 | N-1 | 1 | 1 | 3 | 3 |
| N | 0 | 1 | N | 1 | 1 | 3 | 3 |
| N+1 | 0 | 2 | 1 | 2 | 1 | 3 | 3 |
| N+2 | 0 | 2 | 2 | 2 | 1 | 3 | 3 |
| N+3 | 0 | 2 | 3 | 2 | 1 | 3 | 3 |
| . | . | . | . | . | . | . | . |
| 2N-1 | 0 | 2 | N-1 | 2 | 1 | 3 | 3 |
| 2N | 0 | 2 | N | 2 | 1 | 3 | 3 |
| 2N+1 | 0 | 3 | 1 | 3 | 1 | 3 | 3 |
| 2N+2 | 0 | 3 | 2 | 3 | 1 | 3 | 3 |
| 2N+3 | 0 | 3 | 3 | 3 | 1 | 3 | 3 |
| . | . | . | . | . | . | . | . |

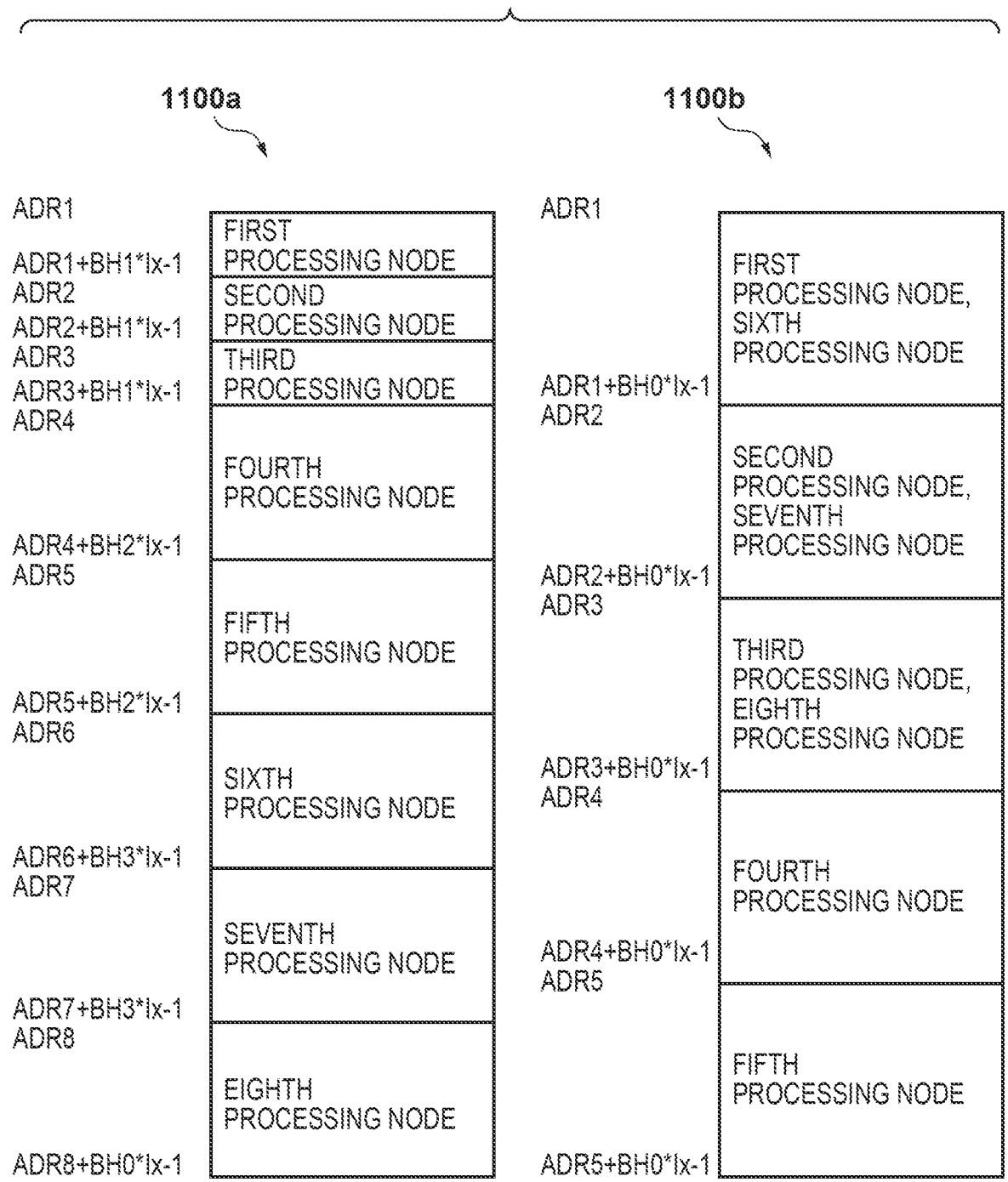

FIG. 16A

RING BUFFER PROCESSING

| SEQUENCE NUMBER | INPUT FEATURE PLANE NUMBER | OUTPUT FEATURE PLANE NUMBER | PROCESSING LINE | WEIGHTING COEFFICIENT NUMBER | CALCULATION TYPE | FILTER WIDTH | FILTER HEIGHT |
|---|---|---|---|---|---|---|---|
| 1 | 0 | 1 | 1 | 1 | 1 | 3 | 3 |
| 2 | 0 | 2 | 1 | 2 | 1 | 3 | 3 |
| 3 | 0 | 3 | 1 | 3 | 1 | 3 | 3 |
| 4 | 0 | 1 | 2 | 1 | 1 | 3 | 3 |
| 5 | 0 | 2 | 2 | 2 | 1 | 3 | 3 |
| 6 | 0 | 3 | 2 | 3 | 1 | 3 | 3 |
| . | . | . | . | . | . | . | . |
| 19 | 1 | 4 | 2 | 4 | 1 | 3 | 3 |
| 20 | 2 | 4 | 2 | 6 | 1 | 3 | 3 |
| 21 | 3 | 4 | 1 | 8 | 1 | 3 | 3 |
| 22 | 1 | 5 | 5 | 5 | 1 | 3 | 3 |
| 23 | 2 | 5 | 6 | 7 | 1 | 3 | 3 |
| 24 | 3 | 5 | 3 | 9 | 1 | 3 | 3 |
| 25 | 0 | 1 | 5 | 1 | 1 | 3 | 3 |
| 26 | 0 | 2 | 6 | 2 | 1 | 3 | 3 |
| 27 | 0 | 3 | 7 | 3 | 1 | 3 | 3 |
| . | . | . | . | . | . | . | . |
| 31 | 1 | 5 | 3 | 5 | 1 | 3 | 3 |
| 32 | 2 | 5 | 3 | 7 | 1 | 3 | 3 |
| 33 | 3 | 5 | 3 | 9 | 1 | 3 | 3 |
| 34 | 0 | 1 | 11 | 1 | 1 | 3 | 3 |
| 35 | 0 | 2 | 12 | 2 | 1 | 3 | 3 |
| 36 | 0 | 3 | 13 | 3 | 1 | 3 | 3 |
| 37 | 1 | 4 | 4 | 4 | 1 | 3 | 3 |
| . | . | . | . | . | . | . | . |
| 1080 | 3 | 5 | 120 | 9 | 1 | 3 | 3 |

| | Input | L1 | L2 | L3 | L4 | L5 | L6 | L7 | L8 | L9 |
|---|---|---|---|---|---|---|---|---|---|---|
| Feature map | 320x240 | 320x240 | 160x120 | 160x120 | 160x120 | 80x60 | 80x60 | 40x30 | 40x30 | 40x30 |
| #Feature map | 1 | 3 | 32 | 64 | 512 | 256 | 256 | 512 | 512 | 512 |
| Kernel size | N/A | 10x10 | 7x7 | 5x5 | 3x3 | 3x3 | 3x3 | 3x3 | 3x3 | 3x3 |
| Line : Feature map size | N/A | 0.3 | 4.9 | 54.9 | 342.9 | 1494.9 | 2070.9 | 3222.9 | 5526.9 | 7830.9 |
| Line : Weight size(Sum from L1) | N/A | 9.4 | 44.4 | 103.8 | 397.5 | 615.0 | 1230.0 | 2460.0 | 4920.0 | 9840.0 |
| Line : Total size | N/A | 9.7 | 49.3 | 158.6 | 740.4 | 2109.9 | 3300.9 | 5682.9 | 10446.9 | 17670.9 |
| Frame : Feature map size | N/A | 300.0 | 1425.0 | 2400.0 | 10800.0 | 10800.0 | 2400.0 | 1800.0 | 1200.0 | 1200.0 |
| Frame : Weight size | N/A | 0.3 | 4.6 | 50.0 | 288.0 | 1152.0 | 576.0 | 1152.0 | 2304.0 | 2304.0 |
| Frame : Total size | N/A | 300.3 | 1429.6 | 2450.0 | 11088.0 | 11952.0 | 2976.0 | 2952.0 | 3504.0 | 3504.0 |

ARITHMETIC PROCESSING APPARATUS AND CONTROL METHOD THEREFOR

BACKGROUND OF THE INVENTION

Field of the Invention

The present invention relates to a technique of reducing a memory size necessary for arithmetic processing using a hierarchical type network with a plurality of processing nodes.

Description of the Related Art

In recent years, a multilayer neural network called a deep network (or deep neural network or deep learning) has attracted great attention. The deep network indicates not a specific calculation method but, generally, a method of performing hierarchical processing (a processing result of a given layer is used as an input to processing of a subsequent layer) for input data (for example, an image). Especially in the field of image identification, a deep network formed from a convolution layer for performing convolution filter calculation and an integration layer for performing integration calculation is becoming the mainstream.

In a recent large-scale connected network called a deep network, the number of connections for generating one feature plane increases, thereby increasing the number of feature planes to be referred to. This increases a memory size to hold feature planes necessary for calculation and a buffer memory size for necessary filter kernels. Therefore, especially if the deep network is implemented by hardware, it is necessary to prepare a large-size RAM (Random-Access Memory) in an LSI, and a circuit scale becomes large. Even if the deep network is implemented by software, if the deep network is implemented in an embedded device, the memory capacity necessary for the system increases, and thus the cost increases. That is, a memory capacity usable for calculation is a finite value determined by the cost that can be spent on the system.

As a method of avoiding an increase in capacity of a memory for holding feature planes, a method of sequentially inputting input data on a partial region basis is used. More specifically, in Japanese Patent Nos. 5184824 and 5171118, convolution filter calculation is sequentially performed over layers by using a memory size of a plurality of lines including each region for efficient convolution filter calculation.

Furthermore, Japanese Patent No. 5368687 proposes a method of selecting in advance a buffer control system for a plurality of feature planes in accordance with the configuration of a network, and processing the whole network in accordance with the selected system. In this method, the memory size can be reduced by selecting, from a plurality of buffer control systems, a system in which a necessary memory size is small.

However, the network structure of a recent deep network diversifies in terms of coarse or fine connection between layers and a layer structure. In a deep network having a deep hierarchy, it is necessary to hold feature plane data over multiple layers even for a partial region, resulting in an increase in memory size. In this case, from the viewpoints of holding feature planes and holding filter kernel coefficients, the above-described conventional technique may not substantially reduce the necessary memory size.

SUMMARY OF THE INVENTION

According to one aspect of the present invention, an arithmetic processing apparatus for executing processing using a hierarchical type network formed by a plurality of processing nodes, comprises: a storage unit configured to store a parameter used by each of the plurality of processing nodes for arithmetic processing and a calculation result of the arithmetic processing in each of the plurality of processing nodes; and a buffer control unit configured to switch, based on a configuration of the hierarchical type network, a buffer system of the parameter and the calculation result in the storage unit in at least one layer of the hierarchical type network.

The present invention makes it possible to execute, with a smaller memory size, arithmetic processing using a hierarchical type network with a plurality of processing nodes.

Further features of the present invention will become apparent from the following description of exemplary embodiments (with reference to the attached drawings).

BRIEF DESCRIPTION OF THE DRAWINGS

The accompanying drawings, which are incorporated in and constitute a part of the specification, illustrate embodiments of the invention and, together with the description, serve to explain the principles of the invention.

FIGS. 10A and 10B show tables respectively showing examples of sequence control information;

FIG. 11 shows views respectively showing examples of memory allocation in ring buffer control and frame buffer control;

FIGS. 16A and 16B show a table showing an example of sequence control information when switching a buffer control system; and FIG. 17 shows a table showing estimate examples of a necessary memory size at the time of line buffer processing.

DESCRIPTION OF THE EMBODIMENTS

Preferred embodiments of the present invention will be described in detail below with reference to the accompanying drawings. Note that the following embodiments are merely examples, and are not intended to limit the scope of the present invention.

First Embodiment

As the first embodiment of an arithmetic processing apparatus according to the present invention, a pattern detection apparatus for detecting a specific object in an image by CNN processing will be exemplified below. CNN is an abbreviation for Convolutional Neural Networks.

<Technical Premise>

CNN is a representative method as a method of implementing a deep network. A method based on the CNN will be described below.

Figure 4:
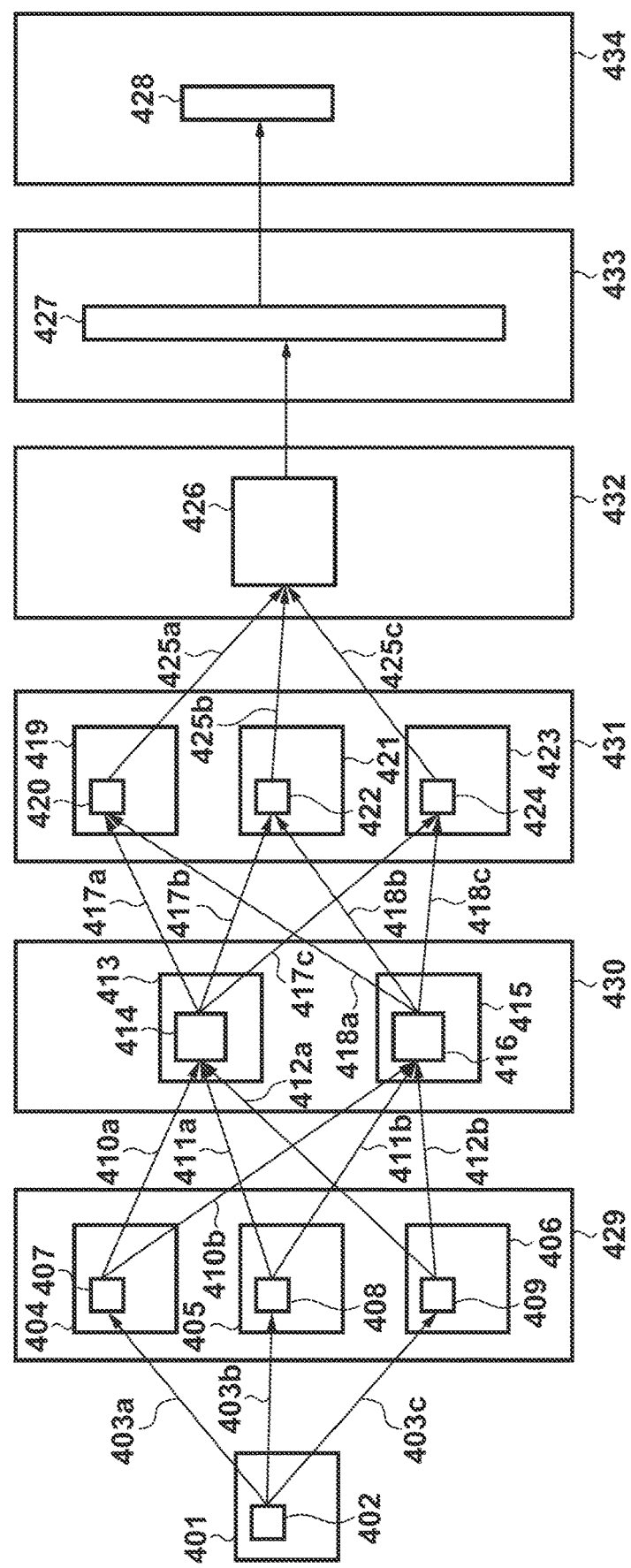
FIG. 4 is a view exemplarily showing the network configuration of CNN.

FIG. 4 is a view exemplarily showing the network configuration of the CNN. More specifically, FIG. 4 shows an example of convolution filter calculation processing using a filter kernel 402 for an input image 401 as a processing target. In this case, a convolution filter calculation result is calculated by product-sum calculation processing given by:

$$f_{i,j} = \sum_{s=-1/rowSize}^{rowSize/2} \sum_{t=-1/columnSize}^{columnSize/2} (d_{i+s, j+t} \times w_{s,t}) \quad (1)$$

where "$d_{i,j}$" represents a processing target image pixel value at coordinates (i, j), "$f_{i,j}$" represents a filter calculation result at the coordinates (i, j), "$w_{s,t}$" represents the value (weighting coefficient) of a filter kernel applied to a processing target image pixel value at coordinates (i+s, j+t), and "columnSize" and "rowSize" represent a filter kernel size. The above-described calculation is performed while causing the filter kernel 402 to scan in the processing target image, thereby obtaining the output result of the convolution filter calculation. An intrinsic parameter value for the filter kernel will be referred to as a weighting coefficient hereinafter.

A feature amount is generated by nonlinear transformation processing represented by convolution filter calculation and sigmoid transformation. The calculation for generating a feature amount for the input image is hierarchically, repeatedly performed, thereby obtaining a feature plane expressing the feature of the image. That is, a two-dimensional feature amount generated by repeating the convolution filter calculation for the entire input image corresponds to a feature plane.

A configuration of using the convolution filter calculation for feature amount extraction processing from the image and using, for identification processing using the extracted feature amount, matrix product calculation represented by a perceptron is a typical deep network. This feature amount extraction processing is often multilayer processing of repeating convolution filter calculation many times, and a fully-connected multilayer perceptron may be used for the identification processing. This configuration is a general configuration as a deep network that has been extensively studied recent years.

A calculation example of the deep network will be described with reference to FIG. 4. FIG. 4 shows processing of performing feature amount extraction for the input image (input layer) 401 by convolution filter calculation to obtain feature amounts of a feature plane 426, and performing identification processing for the obtained feature amounts to obtain an identification result 428. To obtain the feature plane 426 from the input image 401, the convolution filter calculation is repeated many times. Furthermore, fully-connected perceptron processing is performed for the feature plane 426 a plurality of times, thereby obtaining the final identification result 428. Note that layers 429 to 434 represent processing layers (stages).

First, the convolution filter calculation of the first half will be explained. Referring to FIG. 4, the input image 401 indicates raster-scanned image data of a predetermined size for the image data. Feature planes 404 to 406 indicate feature planes of the first layer 429. As described above, the feature plane indicates a data plane representing the processing result of a predetermined feature extraction filter (convolution filter calculation and nonlinear processing). Since the processing result is that for the raster-scanned image data, the processing result is expressed by a plane. The feature planes 404 to 406 are generated by performing convolution filter calculation and nonlinear processing for the input image 401. For example, pieces of information of the feature planes 404 to 406 are obtained by performing, for the entire input image, nonlinear transformation of the results of convolution calculation with filter kernels corresponding to arrows 403a to 403c representing connections to the region 402 of the input image 401. A structure having a connection relationship necessary for the convolution filter calculation for generating the above-described feature planes is called a hierarchical connection relationship.

Calculation for generating feature planes 413 and 415 of the second layer 430 will be described next. The feature plane 413 is connected to the three feature planes 404 to 406 of the preceding layer 429. Therefore, when calculating data of the feature plane 413, with respect to the feature plane 404, convolution filter calculation using a filter kernel corresponding to connection of an arrow 410a is performed for a region 407 and the thus obtained result is held. Similarly, with respect to the feature planes 405 and 406, convolution filter calculation is performed using filter kernels 411a and 412a and the thus obtained results are held. After the end of the three filter calculation operations, the results are added, and nonlinear transformation processing is performed. The above processing is performed for the entire image, thereby generating the feature plane 413.

Similarly, when generating the feature plane 415, three convolution filter calculation operations are performed using filter kernels corresponding to connections of arrows 410b, 411b, and 412b to the feature planes 404 to 406 of the preceding layer 429. Furthermore, when generating a feature plane 419 of the third layer 431, two convolution filter calculation operations are performed using filter kernels 417a and 418a for the feature planes 413 and 415 of the preceding layer 430. Similarly, with respect to a feature plane 421, convolution filter calculation operations are performed using filter kernels 417b and 418b for the feature planes 413 and 415. With respect to a feature plane 423, convolution filter calculation operations are performed using filter kernels 417c and 418c for the feature planes 413 and 415.

To finally generate the feature plane 426 in the layer 432 by repeating the above-described processing, convolution filter calculation operations are performed using filter kernels 425a, 425b, and 425c for the feature planes 419, 421, and 423 of the preceding layer 431.

FIG. 4 shows a two-layer perceptron. The perceptron is obtained by performing nonlinear transformation for the weighted sum of the elements of input feature amounts. Therefore, matrix product calculation is performed for the feature plane 426, and nonlinear transformation is performed for the thus obtained result, thereby obtaining an identification result 427. By repeating the same processing, it is possible to obtain the final identification result 428.

As described above, in the processing apparatus using the general multilayer neural network, a memory size necessary for arithmetic processing is given by the total of the values of the weighting coefficients of the filter kernels and the feature amounts of the feature planes having a connection relationship necessary for calculation defined by equation (1). For the CNN calculation configuration example shown in FIG. 4, except for a layer input/output image buffer, a feature plane buffer memory of image size×3 (feature planes 404 to 406) and a memory of a filter kernel buffer size necessary for it are required.

Furthermore, to perform convolution filter calculation operations for regions 420, 422, and 424 of the feature planes 419, 421, and 423 of the layer 431, a memory corresponding to the three regions is necessary. To perform calculation, a memory size corresponding to regions 414 and 416 of the feature planes 413 and 415 of the preceding stage (layer 430) is necessary. Similarly, to perform convolution filter calculation operations of the regions 414 and 416, a memory corresponding to the region 407 and regions 408 and 409 of the feature planes 404 to 406 of the layer 429 is required. To generate the regions 407 to 409, a memory corresponding to the region 402 of the input image 401 is necessary.

<Overview>

In the first embodiment, a memory holding system (data buffering system) is switched for each layer in accordance with the configuration of the hierarchical connection relationship of a network structure. Particularly, a mode of reducing a necessary memory size by switching a buffer control system for each layer in consideration of the weighting coefficients of filter kernels in addition to feature planes will be described.

<Apparatus Configuration>

Figure 6:
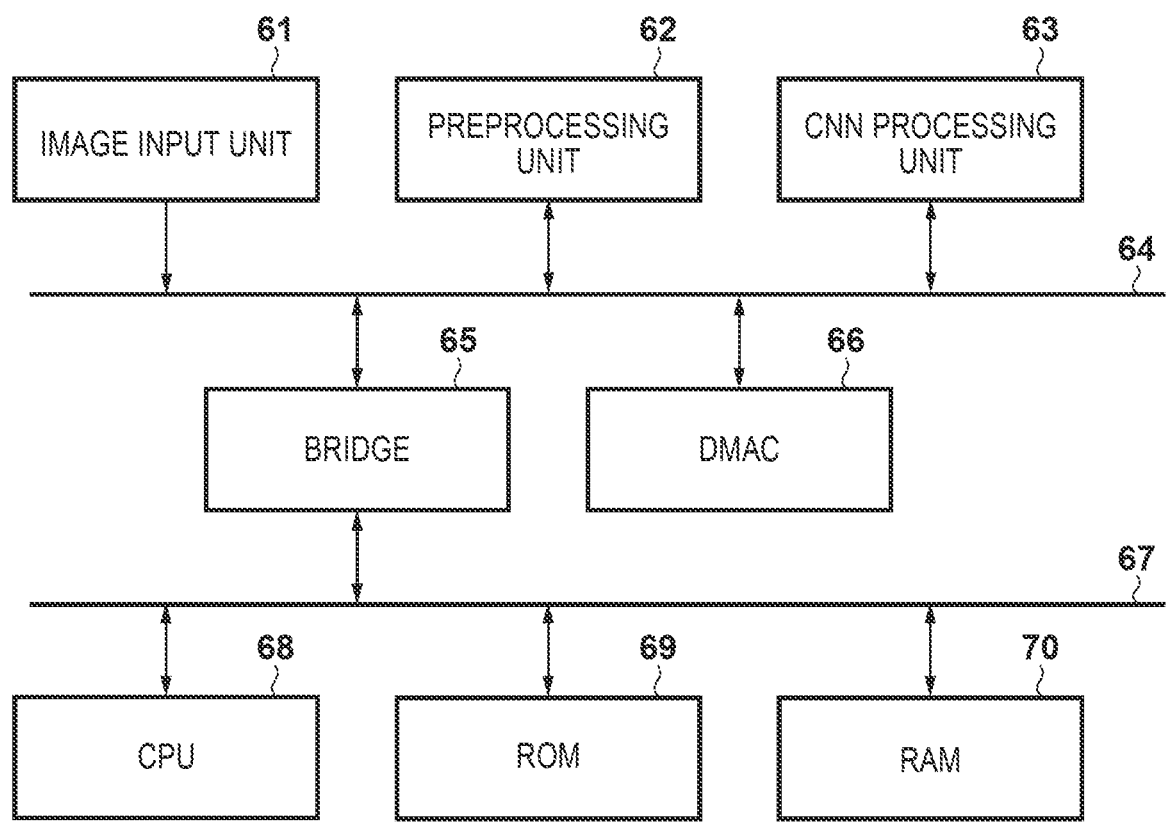
FIG. 6 is a block diagram showing the configuration of a pattern detection apparatus according to the first embodiment.

FIG. 6 is a block diagram showing the configuration of a pattern detection apparatus according to the first embodiment. The pattern detection apparatus is an image processing apparatus including a hierarchical arithmetic processing circuit and having a function of detecting a specific object (image pattern) in image data.

An image input unit 61 includes an optical system and a photoelectric conversion device such as a CCD (Charge-Coupled Devices) or CMOS (Complementary Metal Oxide Semiconductor) sensor. The image input unit 61 also includes a driver circuit for controlling the photoelectric conversion device, an AD converter, a signal processing circuit for controlling various image correction operations, and a frame buffer. A preprocessing unit 62 performs various kinds of preprocessing for effectively executing detection processing. More specifically, the preprocessing unit 62 processes image data transformation such as color transformation processing and contrast correction processing by hardware. A CNN processing unit 63 includes the hierarchical arithmetic processing circuit according to this embodiment, and functions as a feature detection processing unit. Note that details of the CNN processing unit 63 will be described later with reference to FIG. 1.

A DMAC (Direct Memory Access Controller) 66 controls data transfer between the processing units on an image bus 64 and data transfer between the device on the image bus 64 and a RAM (Random Access Memory) 70 on a CPU bus 67. A bridge 65 provides the bridge function between the image bus 64 and the CPU bus 67. A CPU 68 controls the overall operation of the apparatus. A ROM (Read-Only Memory) 69 stores commands for defining the operation of the CPU 68 and parameter data necessary for various calculation operations. For example, the ROM 69 also stores the weighting coefficients of filter kernels necessary for the operation of the CNN processing unit 63, network connection information, and sequence control information. The RAM 70 is a memory necessary for the operation of the CPU 68. The RAM 70 is formed by a memory of a relatively large capacity, such as a DRAM (Dynamic RAM). The CPU 68 can access the various processing units on the image bus 64 via the bridge 65. By separating the image bus 64 and the CFU bus 67, the operation of the CPU 68 and the operations of the image input unit 61, preprocessing unit 62, and CNN processing unit 63 by hardware can be simultaneously executed.

Figure 14:
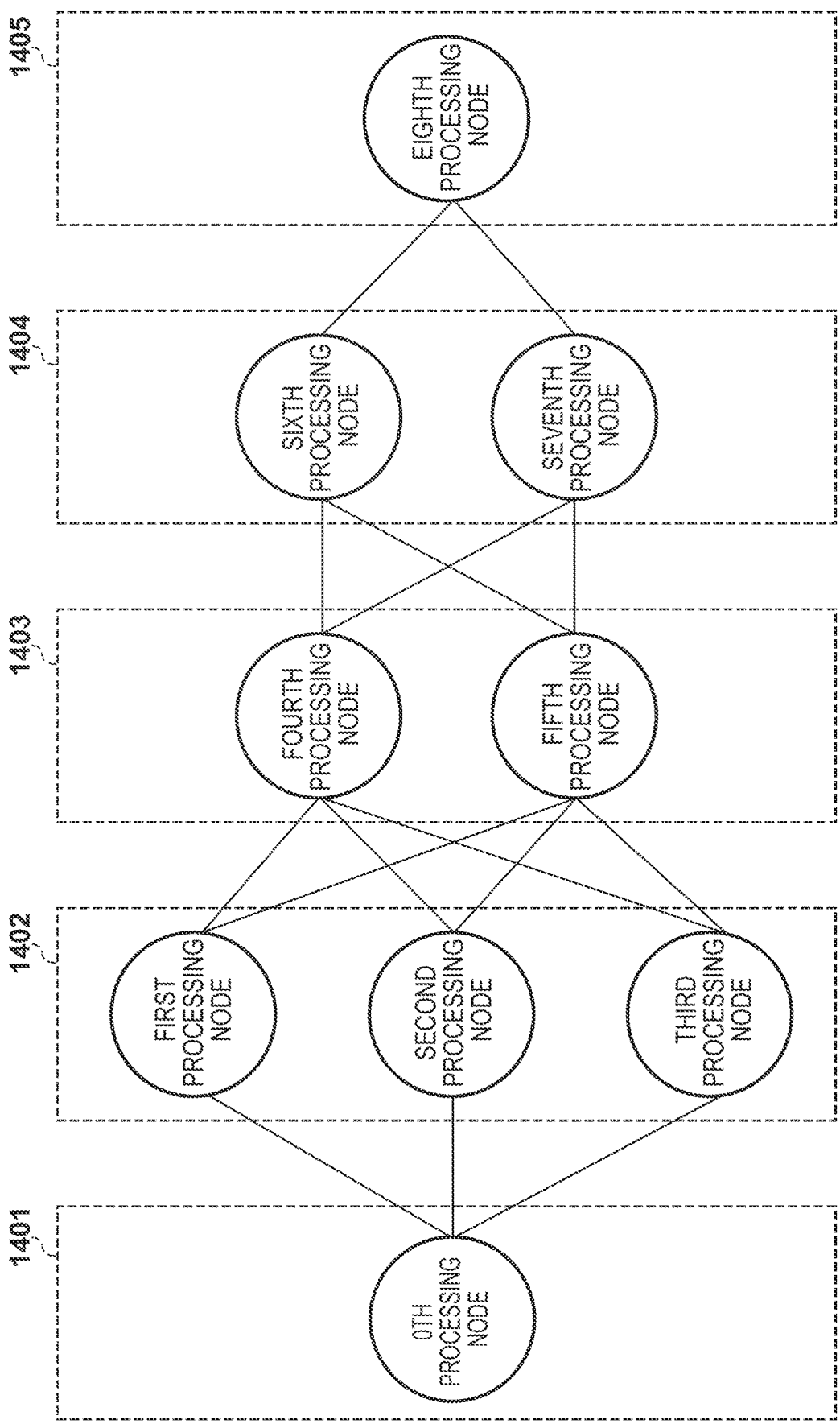
FIG. 14 is a view for explaining the logical connection configuration of a plurality of processing nodes in the CNN.

The pattern detection apparatus performs hierarchical calculation like the CNN. FIG. 14 is a view for explaining the logical connection configuration of a plurality of processing nodes in the CNN. Each processing node in FIG. 14 indicates a block for performing processing of obtaining a convolution calculation result from a convolution calculation target image and a convolution kernel. Note that in FIG. 14, the "0th processing node" is provided for the sake of convenience but no specific processing is generally performed in the 0th processing node, and an input image is input to each of the first to third processing nodes. For example, the fourth processing node performs convolution calculation operations by applying convolution kernels of different coefficients to outputs from the first to third processing nodes. Then, the results of the convolution calculation operations are added, and nonlinear transformation is performed for the addition result, thereby obtaining the calculation result of the fourth processing node.

If the CNN configuration shown in FIG. 14 is applied to the CNN processing unit 63, the arithmetic processing unit is time-divisionally used among the processing nodes to execute a calculation operation defined in each processing node. For example, the calculation operation defined in the first processing node is performed first, and the calculation operation defined in the second processing node is then performed. In this way, CNN calculation is executed. That is, there are a plurality of processing nodes forming the CNN to form a logical network. However, one (same) physical processing node can exist.

Figure 1:
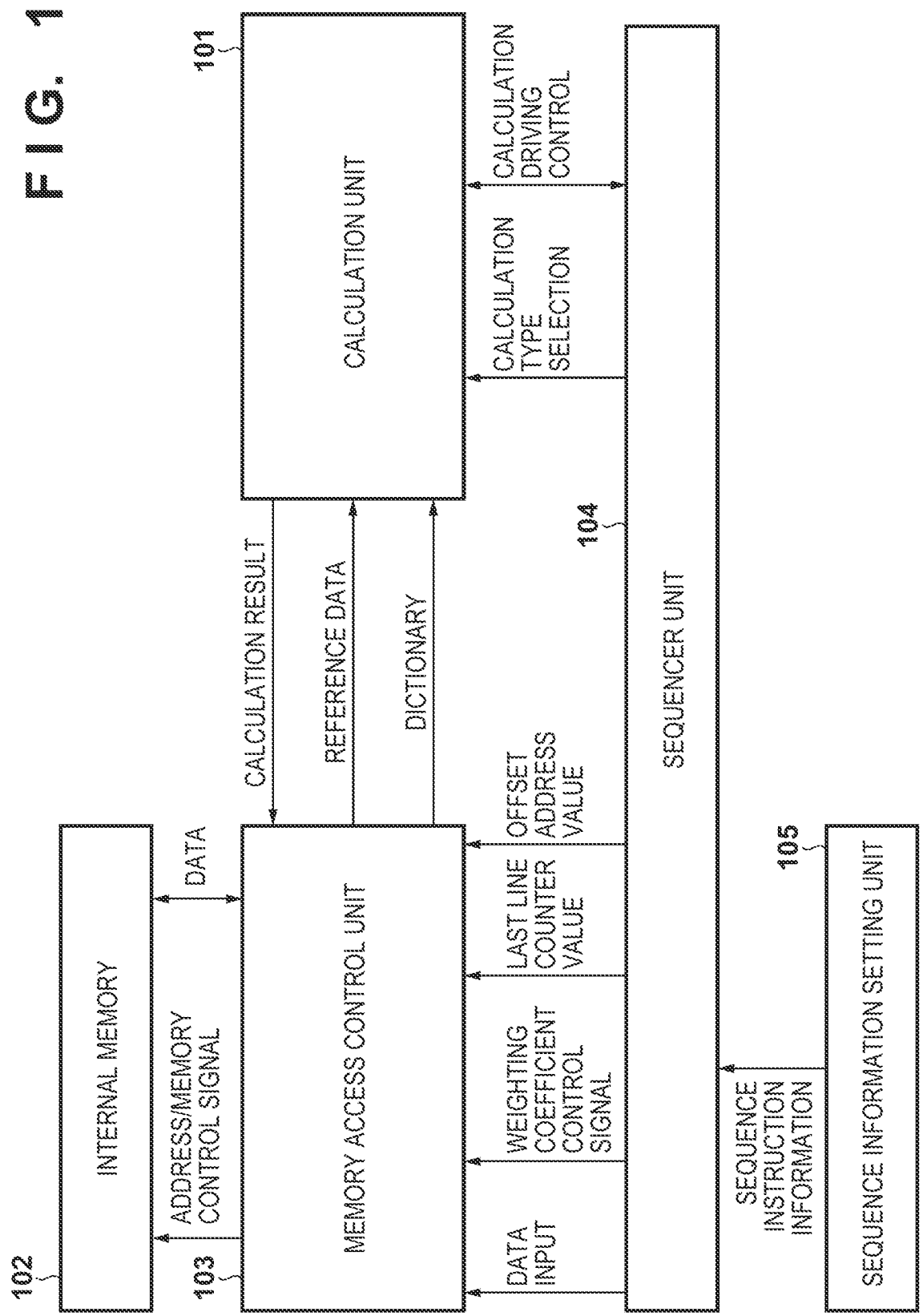
FIG. 1 is a block diagram showing the detailed configuration of a CNN processing unit.

FIG. 1 is a block diagram showing the detailed configuration of the CNN processing unit 63. A calculation unit 101 executes convolution calculation and nonlinear processing for a predetermined data group in accordance with a control signal from a sequencer unit 104.

Figure 12:
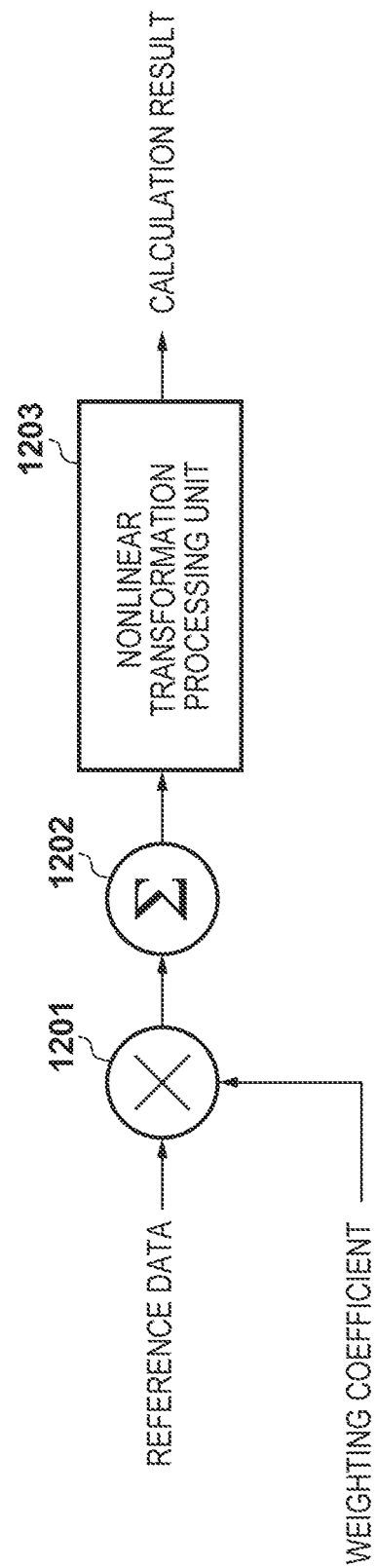
FIG. 12 is a view showing an example of the configuration of a calculation unit.

FIG. 12 is a view showing an example of the configuration of the calculation unit 101. A multiplier 1201 multiplies the weighting coefficient of an input filter kernel by synchronously input data. An accumulator 1202 accumulates outputs from the multiplier 1201 for a predetermined period. A nonlinear transformation processing unit 1203 performs nonlinear transformation for the accumulation result using a logistic function or tanh function. Nonlinear transformation is implemented by, for example, a function table for listing predetermined function values for each input value.

An internal memory (to be simply referred to as a memory hereinafter) 102 serving as a storage unit stores an input image, the feature extraction result of an intermediate layer, a final detection result, the weighting coefficient of a filter kernel, and the like. In this embodiment, to execute convolution calculation at high speed, an SRAM (Static RAM) that can be randomly accessed at high speed is used as the memory 102.

A memory access control unit 103 performs access to the memory 102, generation of an address, read/write signal control, data bus direction control, and the like in accordance with signals from the sequencer unit 104. The memory access control unit can write data in the internal memory via the sequencer unit and the memory access control unit in accordance with an externally input command. This is used when holding, in the internal memory, the input image or the weighting coefficient of a filter kernel used for convolution calculation. Furthermore, the data input line of the sequencer unit 104 for holding, in the memory 102, the input image and dictionary data held in an external memory at the time of CNN processing is connected to the memory access control unit, thereby supplying data necessary for the CNN processing.

Figure 2:
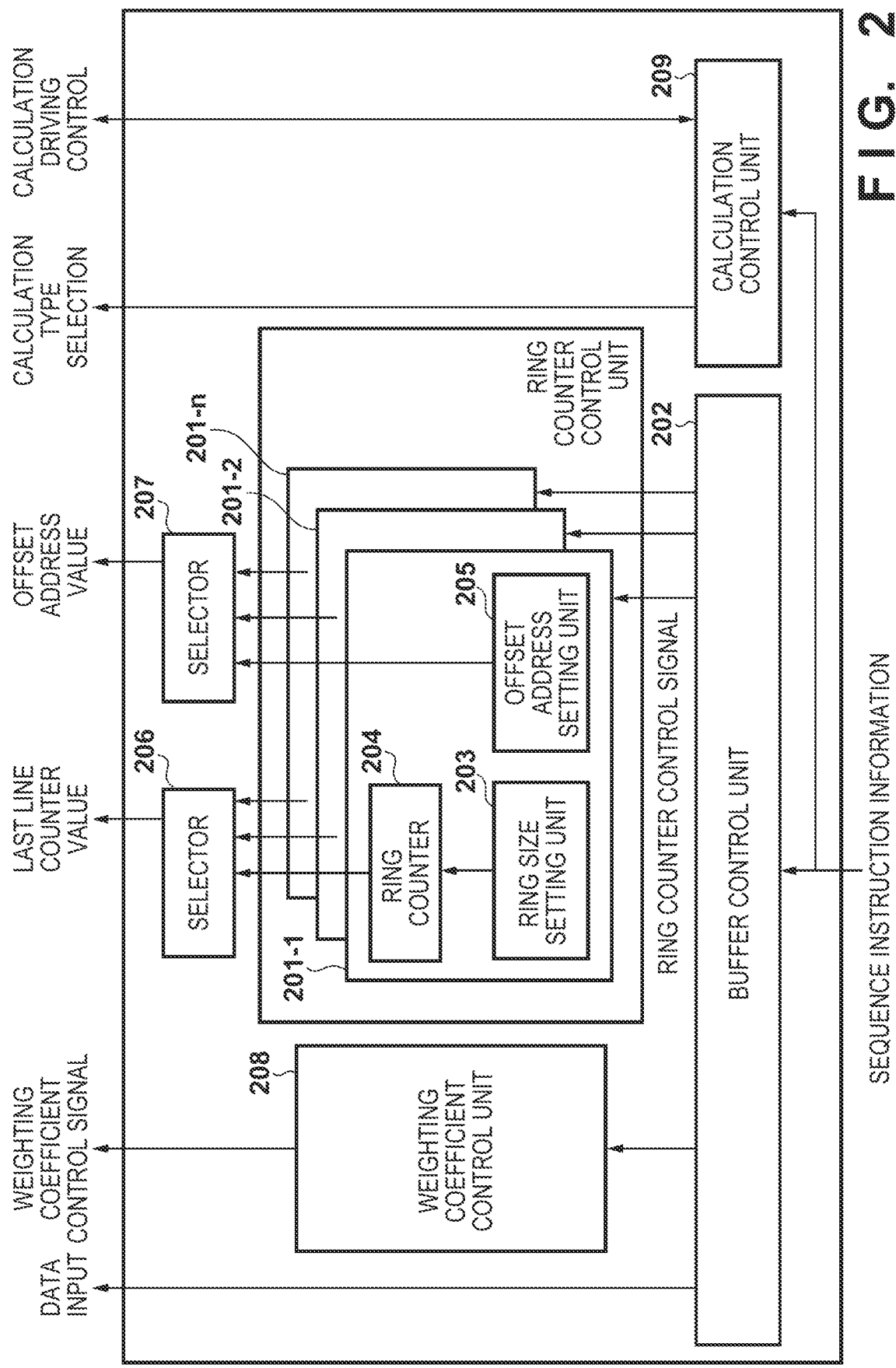
FIG. 2 is a block diagram showing the detailed configuration of a sequencer unit.

FIG. 2 is a block diagram showing the detailed configuration of the sequencer unit 104. The sequencer unit 104 is divided into a portion of generating a feature plane control sequence, a portion of controlling the sequence of the weighting coefficients of the filter kernels, and a portion of generating a control signal to the calculation unit.

The portion of generating a sequence signal for controlling a feature plane will be described first. The sequencer unit 104 includes a plurality of ring counter control units 201-1 to 201-n each of which is used by each processing node to use the memory 102 as a frame buffer and ring buffer. When indicating an arbitrary one of the ring counter control units 201-1 to 201-n, it is described as the ring counter control unit 201. The ring counter control unit 201 is prepared for each logical processing node of CNN calculation. Each ring counter control unit 201 outputs, to the ring counter control unit 201, a signal for performing control by the ring buffer system or frame buffer system based on selection of a buffer control system in each sequence in accordance with an instruction from a buffer control unit 202. For the sake of descriptive simplicity, a mode in which the ring buffer system and the frame buffer system are usable will be described. However, the present invention is not limited to them.

Each ring counter control unit 201 includes a ring size setting unit 203 for designating the size of a ring buffer, a ring counter 204 for holding the operation status of the ring buffer, and an offset address setting unit 205 for determining a physical address on the memory 102. An output from the ring counter control unit 201 is selected by a selector 206 or 207, and provided to the memory access control unit 103. This configuration allocates, to the memory 102, a memory area for an intermediate buffer for holding calculation result data in correspondence with each of the plurality of processing nodes forming the network.

The weighting coefficients will be explained next. A weighting coefficient control unit (parameter control unit) 208 performs memory control (parameter control) of the weighting coefficients of the filter kernels necessary for CNN calculation, and generates an address at which the corresponding coefficients according to the buffer control system are stored. The weighting coefficient control unit performs a different control operation in accordance with the control system. Details of the feature plane data and weighting coefficient control operation along with each buffer control system will be described later.

Finally, a calculation control unit 209 will be described. In accordance with the above-described feature planes and the weighting coefficient control signal, data is supplied from the memory 102, and it is necessary to control the calculation unit 101 to perform appropriate processing for input data in accordance with the sequence. The calculation control unit 209 generates/outputs a control signal.

A sequence control information setting unit 105 holds, in advance, sequence control information (to be described later) as table data. The table data is formed by a register or RAM. The sequencer unit 104 sequentially controls the operations of the memory access control unit 103 and calculation unit 101 in accordance with the table data, thereby implementing the arithmetic processing of the hierarchical type network based on predetermined unit calculation (to be described later).

The image bus 64 and CPU bus 67 are bus interfaces used by the CPU 68 to access the memory and various registers in the CNN processing unit 63. For example, the following data can be written from the CPU 68 via the interfaces. The write destination is the memory 102, as described above.

Sequence control information of sequence control information setting unit 105

Weighting coefficients held in memory 102 and required by calculation unit 101

Input image

Figure 5:
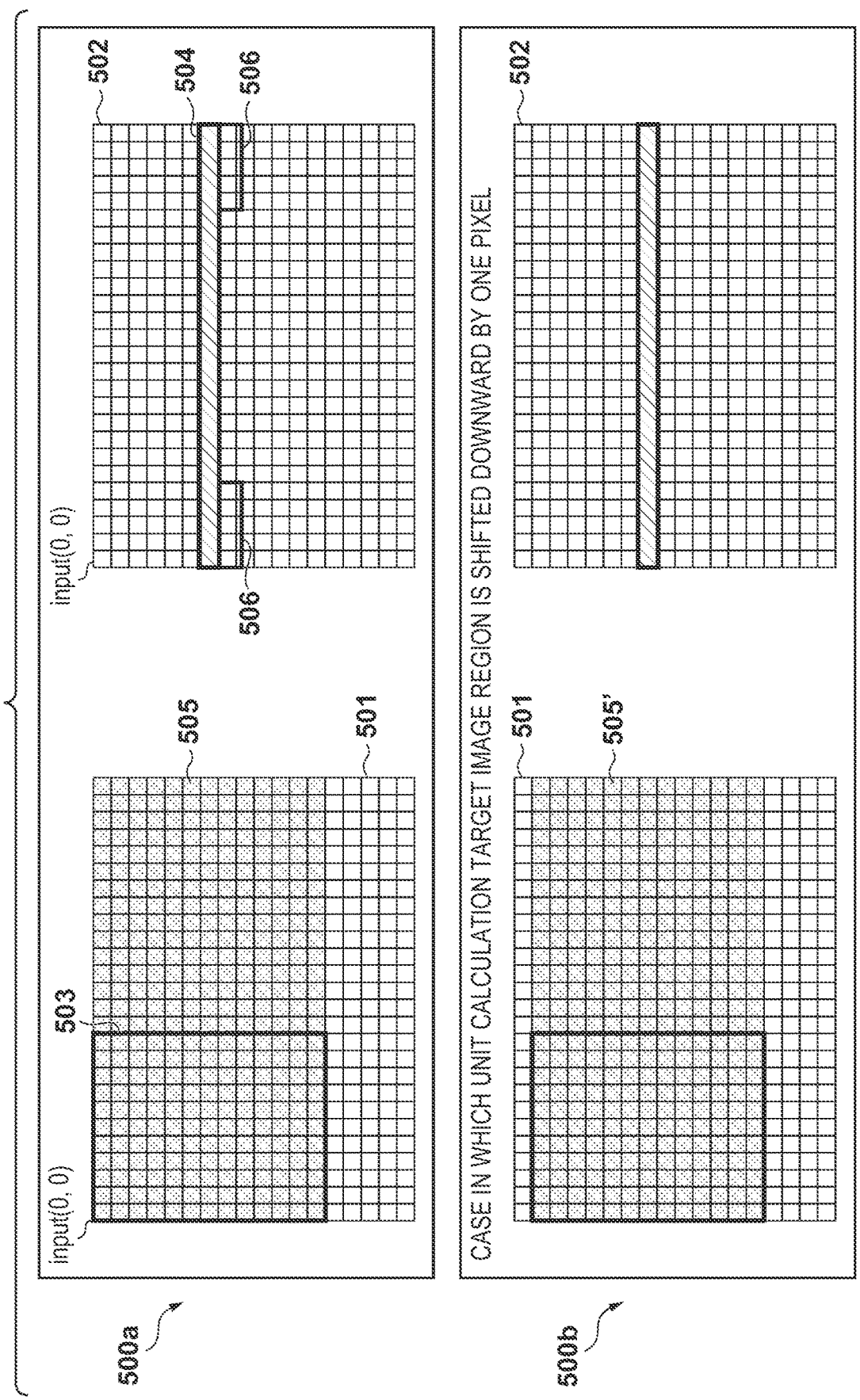
FIG. 5 shows views for explaining arithmetic processing on a line basis.

FIG. 5 shows views for explaining arithmetic processing on a line basis. As described above, predetermined unit calculation according to the first embodiment is convolution calculation on a line basis performed using the calculation unit 101, regardless of ring buffer control and frame buffer control. For the sake of descriptive simplicity, FIG. 5 shows a case in which convolution calculation is performed using the calculation output image (or an input image to the network) of one processing node as a calculation target image, and nonlinear transformation is also omitted.

In a schematic view 500a, each minimum square schematically shown in a calculation target image (reference image) 501 indicates each of pixels of the calculation target image as an input image or an image of a calculation result in the processing node of the preceding layer in the raster scan order. This pixel is represented by input(x, y) where x presents a horizontal direction position and y represents a vertical direction position.

An image 502 represents an image of a calculation result, and each minimum square schematically shown indicates each of pixels of the calculation result in the raster scan order. This pixel is represented by output(x, y) where x represents a horizontal direction position and y represents a vertical direction position.

A region 503 surrounded by thick lines in the calculation target image 501 indicates a region of a reference image when processing convolution calculation at a position of output(6, 7). The region 503 indicates a case in which the size of the convolution kernel is defined by "11" in the horizontal direction and "13" in the vertical direction.

A region 504 surrounded by thick lines in the image 502 of the calculation result indicates a resultant region obtained when unit calculation (calculation for one line in the horizontal direction) is performed for the calculation target image 501. A grid-like hatched region 506 in the region 504 corresponds to pixels of a peripheral region (a region where no calculation is performed) that is generated depending on the size of a convolution kernel. That is, a reference image region where calculation at a position of output(5, 7) is to be performed is obtained by shifting the region 503 leftward by one pixel. However, such region extends outside the calculation target image 501 (reference region), and thus some reference pixels do not exist. Note that a method of processing this peripheral region (invalid region) in hierarchical processing is not essential to the present invention and a description thereof will be omitted. In this example, a default value is embedded. However, deletion processing may be performed or a predetermined calculation result may be embedded. Note that lines above the region 504 also become an invalid region.

As is apparent from FIG. 5, to perform unit calculation for one line, at least a region 505 is required as a necessary region of the calculation target image 501. The region 505 is shown as a hatched region in FIG. 5, and needs to have a size in the horizontal direction that is equal to that of the calculation target image 501 and a size in the vertical direction that is equal to that of the convolution kernel. For the sake of descriptive convenience, this region will be referred to as the unit calculation target image region 505 hereinafter. Unit calculation indicated by the region 504 is performed while shifting the unit calculation target image region 505, thereby making it possible to perform convolution calculation over the entire region of the calculation target image 501. For example, a schematic view 500*b* shows a case in which unit calculation is performed for the unit calculation target image region shifted downward by one pixel. At this time, whether a given unit calculation can be executed depends on whether pixel data of a unit calculation target image region 505' of the unit calculation has been calculated by the processing node of the preceding layer and the thus obtained result has been output. For the processing node that uses a plurality of reference images as inputs for calculation, pixel data of the unit calculation target image regions for all the reference images need to have been output, as a matter of course.

<Buffer Control System>

Figure 7:
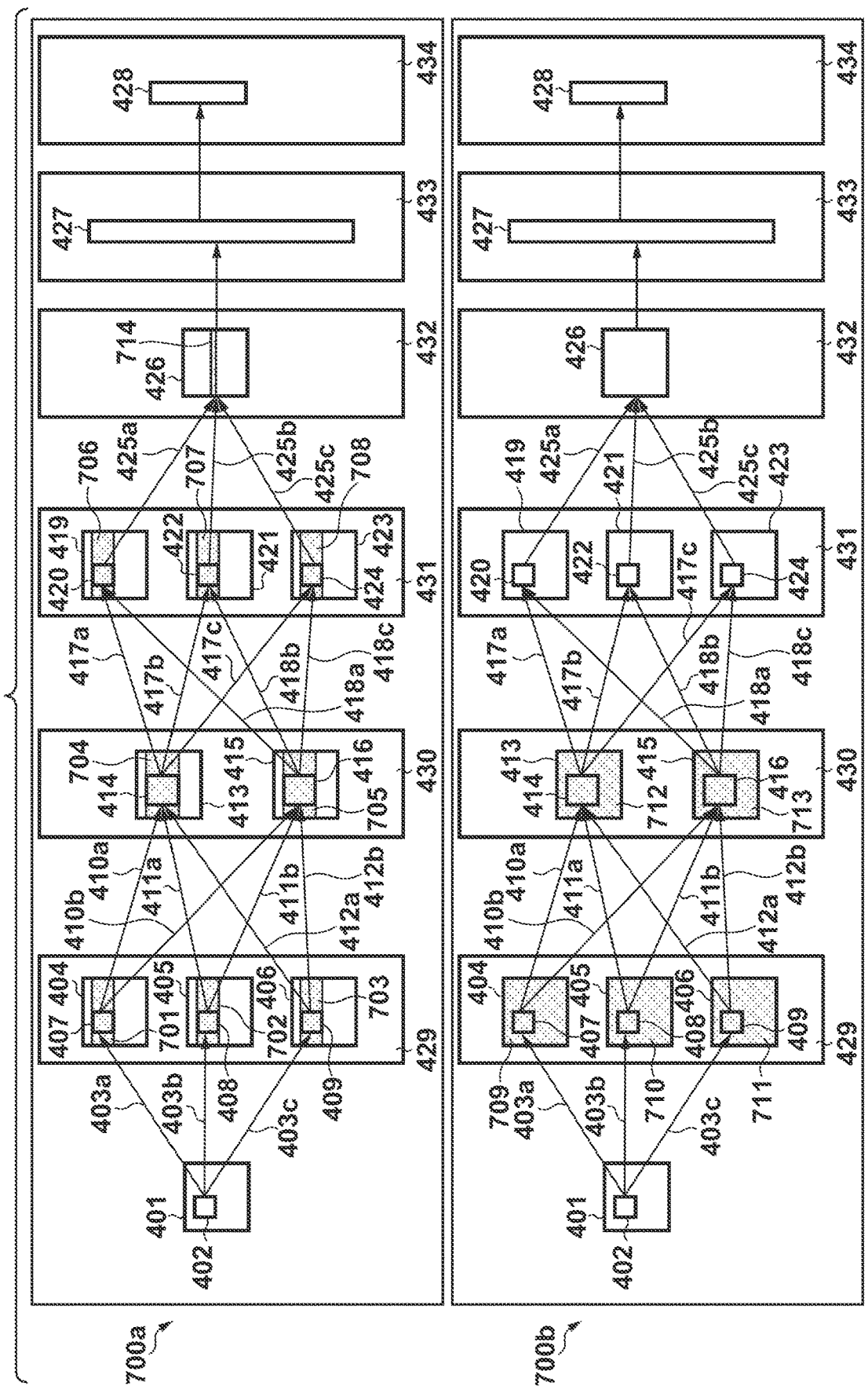
FIG. 7 shows views for explaining a necessary memory capacity in a ring buffer system and that in a frame buffer system.
Figure 13:
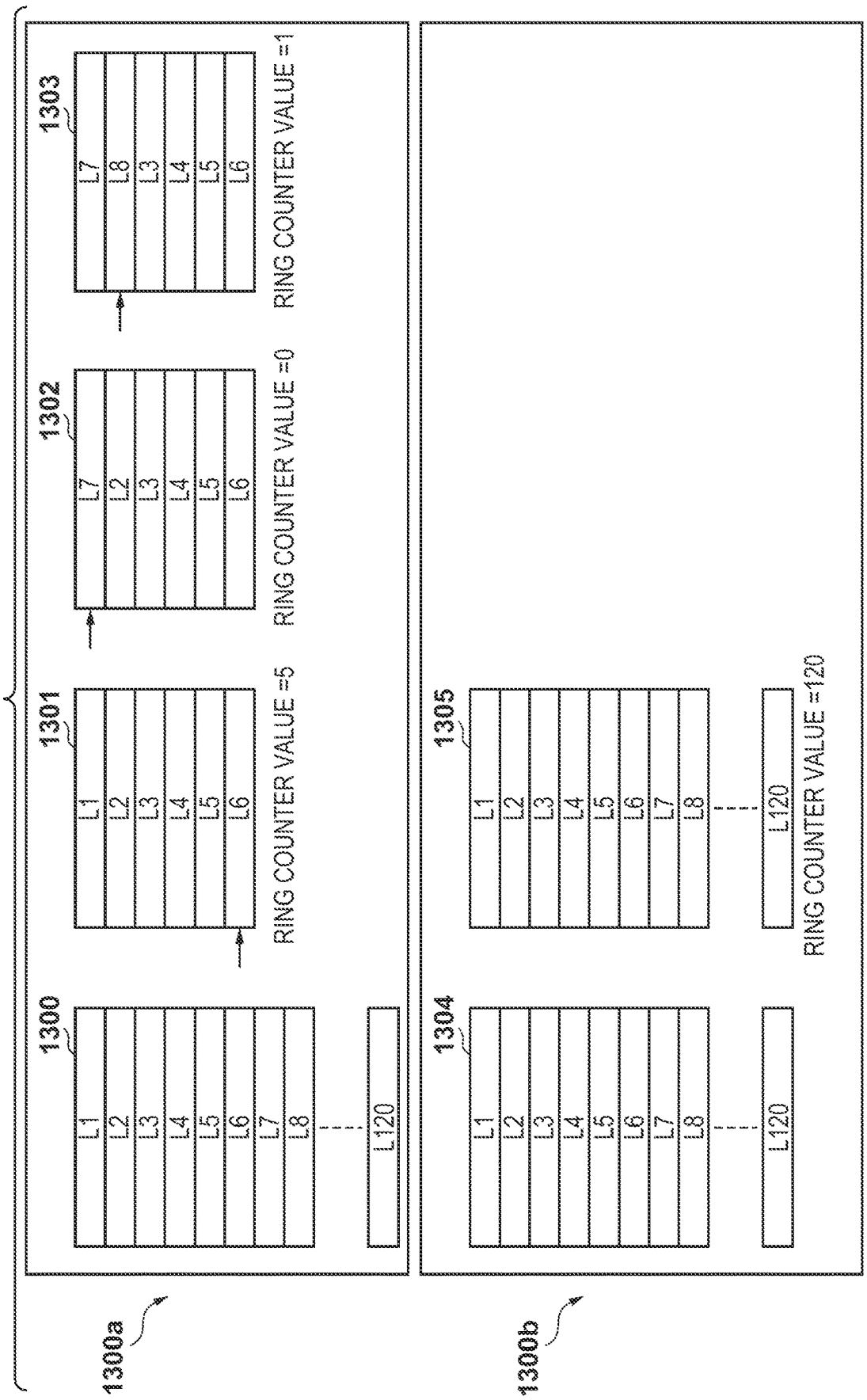
FIG. 13 shows views for respectively explaining the operation of a ring buffer and that of a frame buffer.

Operation examples of different buffer control systems will be described next for the CNN network described with reference to FIG. 4. FIG. 7 shows views for explaining a necessary memory capacity in ring buffer control and that in frame buffer control. FIG. 13 shows views for respectively explaining the operation of the ring buffer and that of the frame buffer.

A schematic view 700*a* of FIG. 7 shows a case in which the CNN network is processed by the ring buffer system. The schematic view 700*a* assumes a case in which the layers 429 to 434 are processed by the ring buffer system.

The arrows 403*a* to 403*c*, 410*a*, 410*b*, 411*a*, 411*b*, 412*a*, 412*b*, 417*a* to 417*c*, 418*a* to 418*c*, and 425*a* to 425*c* represent integration relationships for performing convolution calculation operations using the weighting coefficients of different filter kernels from input feature planes. To generate a region 714 of the feature plane 426 in the layer 432 in the schematic view 700*a*, convolution calculation operations with the feature planes of the preceding layer are necessary. That is, to generate the region 714 of the feature plane 426 in the layer 432, a memory area to store regions 706 to 708 in the layer 431 is necessary. Similarly, to generate the regions 706 to 708, a memory area for regions 704 and 705 of the layer 430 is necessary. To generate the regions 704 and 705, a memory area for regions 701 to 703 of the layer 429 is necessary. That is, a memory size required to perform CNN processing for the feature planes of successive layers (the layers 429 to 431 in FIG. 7) to be processed by the ring buffer system is a total ring buffer size (that is, the total size of the regions 701 to 708). In addition, all the weighting coefficients of the filter kernels based on the above connections are desirably held in the memory from the viewpoint of a processing speed. However, the present invention is not limited to this.

A schematic view 1300*a* of FIG. 13 is a view for schematically explaining the operation of the ring buffer. For the sake of descriptive convenience, the height (circular number) of the ring buffer is set to "6". A method of, if image data of an input image 1300 are input in the raster scan order, holding the data in a ring buffer for six lines and referring to them will be described.

A ring counter accompanying the ring buffer circulates values of "0" to "5". The initial value of the ring counter is "5", and the ring counter is incremented by one when data of one line is input. However, if the counter value of the ring counter is equal to the circular number of the ring buffer, it returns to "0". Since, for example, the circular number of the ring buffer is "6", the counter value returns to "0" after "5".

A state 1301 represents a state in which the ring buffer is fully filled with data (L1 to L6) of six lines from the beginning of the input image 1300, and the ring counter value is "5". When storing the next line, the ring counter is incremented to return to "0", and the first line of the ring buffer is filled with L7. That is, the ring counter value indicates a line in the ring buffer in which the latest line is stored (with reference to "0"). This state is indicated by a state 1302.

in the state 1302, it is possible to refer to L2 to L7 from the ring buffer, and the start line is a line of "ring counter value+1". If a next line LB is stored, the ring buffer is filled with L8 at the position of the second line, as indicated by a state 1303, and the ring counter value is set to "1". In this case, it is possible to refer to L3 to L8, and the start line is a line of "ring counter value+1". In ring buffer control, in all layers in which ring buffer control is performed, all ring buffer sizes can be held and sequentially operated.

The ring buffer whose circular number is "6" has been explained above. However, it is possible to operate the ring buffer by different filter kernel sizes by changing the setting of the circular number of the ring counter value in accordance with the height of the filter kernel used.

A schematic view 700*b* shows a case in which the CNN network is processed by the frame buffer system. In contrast to the schematic view 700*a*, the schematic view 700*b* assumes a case in which the layers 429 to 432 are processed by the frame buffer system. The frame buffer system assumes that CNN processing is performed for each process between two successive layers. Therefore, the example of the schematic view 700*b* will be explained by paying attention to processing between the layers 429 and 430.

In the schematic view 700*b*, CNN processing is performed based on connections (arrows 410*a*, 410*b*, 411*a*, 411*b*, 412*a*, and 412*b*) to the input feature planes 404 to 406 by the weighting coefficients of the different filter kernels, thereby outputting the feature planes 413 and 415. In the frame buffer system, respective corresponding memory sizes are necessary for the total feature plane size of feature planes 709 to 711 and the total weighting coefficient of feature planes 712 and 713. In the frame buffer system, two successive layers undergo CNN processing at once. In the processing of two different successive layers by the frame buffer system, the same memory area can be used. That is, if there are a plurality of pairs of successive layers to be processed by the frame buffer system, a necessary total memory size is the largest one of necessary total memory sizes respectively required by the plurality of pairs. That is, if the necessary total memory size of the layers 430 and 431 is larger than that of the layers 429 and 430, the memory for the necessary total memory size of the layers 430 and 431 is required.

A schematic view 1300*b* is a view for schematically explaining the operation of the frame buffer. In this example, the mechanism of the ring buffer system is extended to the frame buffer system. Buffer processing by the frame buffer system is simple. More particularly, it is only necessary to match the circular number of the ring buffer with the number of lines of the input image data. By only matching the circular number with the number of lines of the input image data, a preceding line is not overwritten during processing of one frame in the buffer. That is, the buffer can be made to function as not only the ring buffer but also the frame buffer. Referring to FIG. 13, it is only necessary to designate, for an input image 1304, a value according to the frame size as a ring counter number, as indicated by a state 1305.

<Operation of Apparatus>

Figure 8:
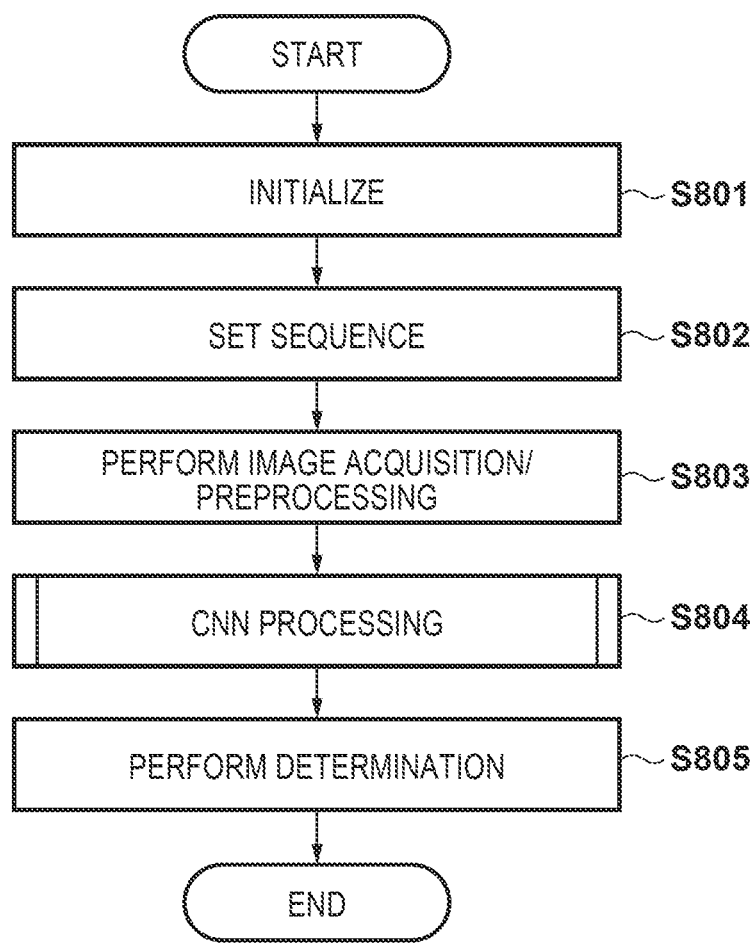
FIG. 8 is a flowchart illustrating control in the pattern detection apparatus.

FIG. 8 is a flowchart illustrating control in the pattern detection apparatus. That is, FIG. 8 shows a series of detection processing operations executed by the CPU 68. Processing by software in the CPU 68 drives hardware processing circuit units such as the image input unit 61 and the CNN processing unit 63 after performing predetermined setting processing and the like.

In step S801, prior to the start of detection processing, the CPU 68 executes various initialization processes of variables, registers, and the like. Each processing unit initializes the internal register, memory, and the like in accordance with an initialization instruction from the CPU 68. At this time, initial setting is also made to set the entire region of the input image size as a processing region. By including this processing, the CPU 68 can access the CNN processing unit 63 and other hardware circuit units via the bridge 65 and the image bus 64, and set data in a predetermined register or memory via a CPU bus access control unit 113.

In step S802, the CPU 68 sets sequence control information in the sequence control information setting unit 105. The sequence control information is in a form of a table of sequence control information for controlling CNN calculation, that includes a buffer control system based on the network configuration, and is formed by a register file, RAM, or the like.

FIGS. 10A and 10B show tables respectively showing examples in which the sequence control information is formed as a table. More specifically, FIGS. 10A and 10B show tables used when processing is performed in the CNN network shown in FIG. 14.

A table 1000a shows an example of the table of the sequence control information for the ring buffer system. A "sequence number" indicates an operation ordinal number, an "input feature plane number" indicates the number of a feature plane as an input to CNN processing, and an "output feature plane number" indicates the number of a feature plane as an output from the CNN processing. The "sequence number" is a number indicating a processing ordinal number on a line basis, and corresponds to a matrix Index of the table. Therefore, it is unnecessary to actually hold a number. Furthermore, a "processing line" indicates a line number in the output feature plane, and a "weighting coefficient number" indicates the number of the weighting coefficient of a filter kernel. In addition, a "calculation type" indicates the processing contents of the CNN processing, and a "filter width" and a "filter height" indicate the size of kernel calculation. In this example, a line is a processing unit, and the processing node is switched every time 1-line unit processing is performed.

For example, up to a sequence number "9", processes for output feature plane numbers "1" to "3" are performed for the input image (the input feature plane number in this example). In sequence numbers "10" to "15", processes for output feature plane numbers "4" and "5" of the next layer are performed. This is done because reference images necessary for arithmetic processing of one line of each of the output feature plane numbers "4" and "5" are calculated up to the sequence number "9".

In the ring buffer system, by quickly performing line unit calculation from the processing node that can perform calculation, the reference side buffer can be sequentially released on a line basis. This can form an intermediate buffer as a ring buffer of a minimum circular number. On the other hand, by paying attention to the weighting coefficient, the weighting coefficient of a filter kernel corresponding to each output feature plane changes in accordance with the input feature plane as a reference feature plane. For example, in the sequence numbers "1", "2", and "3", even if the input feature plane numbers are equal to each other, the output feature plane numbers are different from each other, and thus weighting coefficients used for convolution are different, that is, "1", "2", and "3". In the sequence numbers "19", "20", and "21", since the input feature plane numbers for the output feature plane number "4" are different, that is, "1", "2", and "3", the weighting coefficient numbers are different, that is, "4", "6", and "8".

With the above sequence, when processing is performed by the ring buffer system, necessary values are referred to over the layers at the time of feature plane processing with respect to the weighting coefficients used. Therefore, the weighting coefficients processed by the ring buffer system are desirably held in the internal memory to prevent an increase in number of accesses to the external memory. That is, a method of ensuring an intermediate buffer of a minimum circular number for the output feature planes and internally holding all the necessary coefficients with respect to the weighting coefficients is used.

A table 1000b shows an example of the table of the sequence control information for the frame buffer system. Unit calculation of a specific processing node is continuously performed. Then, after the calculation of the specific processing node is completed for the entire valid region, calculation of the next processing node starts.

In the table 1000b, for example, processing is performed by switching among CNN processes for the output feature plane numbers "1" to "3" every time calculation of the entire valid region of each feature plane is complete. This processing is repeatedly performed between two successive layers, and thus an already processed feature plane may become unnecessary. For example, when processing between the layers 1403 and 1404 is performed, the output feature planes "6" and "7" as a result of CNN processing corresponding to the input feature plane numbers "4" and "5" do not require the intermediate buffer area of the input feature planes "1" to "3" in the processing between the two preceding successive layers. Therefore, at the timing when calculation up to the last layer is incomplete, the buffer area can be released and allocated as an area for output of processing node numbers "6" and "7".

Similarly to the ring buffer system, by paying attention to the weighting coefficient, the input feature plane is continuously referred to with respect to the output feature plane. For example, in the sequence numbers "1" to "N", the input feature plane number "0" is referred to with respect to the output feature plane number "1", and the same weighting coefficient number "1" of the filter kernel is continuously referred to. That is, it is found that the weighting coefficient is continuously referred to for a predetermined period. For example, by switching the weighting coefficient between the layers in which convolution calculation is performed, the need for simultaneously holding, in the internal memory, all the weighting coefficients of the filter kernels necessary for the frame buffer is eliminated. Therefore, for example, in frame buffer control, it is only necessary to hold, as an intermediate buffer, a necessary size between the layers with respect to the feature planes and the weighting coefficients of the filter kernels. In the next layer, the feature planes and weighting coefficients used in the preceding layer are unnecessary.

For CNN calculation, the weighting coefficient of the filter kernel is selected in accordance with the calculation type. As CNN calculation, there are calculation types such as kernel calculation processing, normalization, and pooling processing. For the sake of descriptive simplicity, however, FIGS. 10A and 10B show only examples corresponding to the kernel calculation processing. The "filter width" corresponds to the width of the convolution kernel corresponding to the filter, and the "filter height" corresponds to the height of the convolution kernel.

Note that in this embodiment, each processing node sets to calculate a maximum calculation enable range for the input image. The calculation range may be back-calculated toward the preceding layer from the calculation range which the processing node that finally uses the calculation result wants to use, as a matter of course. In this case, by holding the end line as information, calculation can be performed without any waste.

FIG. 11 shows views respectively showing examples of memory allocation in ring buffer control and frame buffer control. More specifically, FIG. 11 shows memory maps each showing an example of the relationship between the processing node and an offset address and the height of the ring buffer when implementing the network shown in FIG. 14. A memory map 1100a is that for the ring buffer system, and a memory map 1100b is that for the frame buffer system.

ADRx (x: 1 to 8) corresponds to the offset address, and BHx (x: 1 to 3) corresponds to the height (circular number) of the ring buffer. Ix represents the width of the input image data. As already described above, in frame buffer control, the memory area is reduced by allocating the intermediate buffer area used in the preceding layer to processing of the current layer and performing the processing. This is the reason why the sixth and seventh feature planes are assigned to portions of the first and second feature planes in the memory map 1100b.

In step S803, the CPU 68 performs image processing/preprocessing. Upon receiving a processing start instruction from the CPU 68, the image input unit 61 acquires image data of one frame, and stores the acquired image data in the internal buffer. After the end of storage of the image data, the image input unit 61 generates an image acquisition end interrupt to the CPU 68. Upon detecting the interrupt, the CPU 68 activates the DMAC 66, and transfers the acquired image data to the internal memory (not shown) of the preprocessing unit 62. After the end of transfer of the image data, the preprocessing unit 62 starts preprocessing. For example, the preprocessing unit 62 corrects the contrast of the image data in accordance with contrast correction information designated in advance. After the end of the correction processing, the preprocessing unit 62 generates an interrupt to the CPU 68. Upon detecting the interrupt, the CPU 68 activates the DMAC 66 again, and transfers the image data corrected by the preprocessing unit 62 to the input image buffer (corresponding to the 0th processing node area of FIG. 11) of the memory 102 in the CNN processing unit 63.

Figure 9:
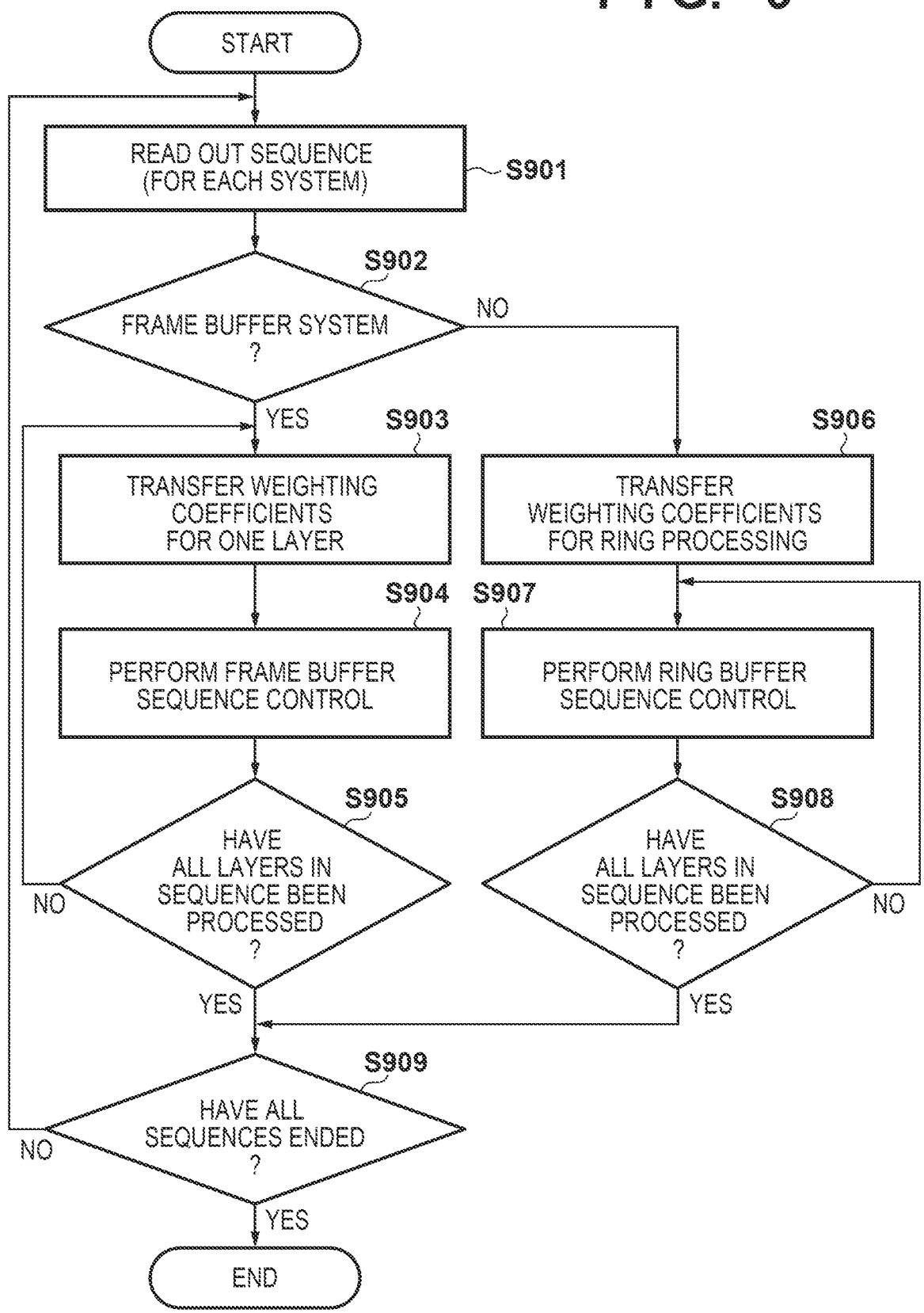
FIG. 9 is a flowchart illustrating the detailed operation of CNN processing.

In step S804, the CPU 68 controls to execute CNN processing based on control by the frame buffer system or ring buffer system. FIG. 9 is a flowchart illustrating the detailed operation of the CNN processing. More specifically, FIG. 9 shows the operation of the sequencer unit 104 for controlling the operation of the CNN processing.

In step S901, the sequencer unit 104 reads out a sequence. In this case, the frame buffer system or ring buffer system is set as a control unit. This is because it is necessary to switch, for each buffer control system, the control sequence of setting the weighting coefficient of the filter kernel in the internal memory from the CPU 68.

In step S902, the sequencer unit 104 determines whether the buffer control system is the frame buffer system. In fact, switching is not performed based on the sequence control information, and the CPU 68 performs control determination, and performs control by the sequence according to the determination.

In steps S903 to S905, control is performed by the frame buffer system. In step S903, the CPU 68 supplies, to the memory 102, the necessary weighting coefficients of the filter kernels necessary on a layer basis. After that, in accordance with a predetermined sequence, the sequencer unit 104 generates a feature plane data supply control signal, and supplies it from the memory 102 to the calculation unit 101 via the memory access control unit 103 on a frame basis. In step S904, the calculation control unit 209 creates a calculation control signal in accordance with the sequence, and the calculation unit 101 performs calculation designated by the sequence in accordance with the calculation control signal from the sequencer unit 104. Output feature plane data is transferred from the calculation unit 101 to the memory 102 via the memory access control unit 103. This processing is sequentially performed for all the feature planes in the target layer. In step S905, if, after the end of all the CNN processes in the given layer, the processing has not been performed for all the layers designated by the sequence, the process returns to step S903. After that, the CPU 68 supplies, to the internal memory, the weighting coefficients of the filter kernels necessary for the next layer, and the same processing is performed until the processing is performed for all the layers in the sequence.

On the other hand, in steps S906 to S908, control is performed by the ring buffer system. In step S906, the CPU 68 supplies, to the memory 102, the weighting coefficients of all the filter kernels (including different layers) necessary for ring processing. In step S907, in accordance with the sequence, the sequencer unit 104 sequentially generates a control signal for ring control, and a control signal for the weighting coefficients of the filter kernels necessary for calculation. In accordance with each control signal, the memory access control unit 103 generates an address, and supplies data from the memory 102 to the calculation unit 101. At this time, similarly to frame buffer control, the calculation control unit 209 creates a calculation control signal in accordance with the sequence, and supplies it to the calculation unit 101, thereby performing necessary calculation. In step S908, if, after the end of all the CNN processes in the given layer, the processing has not been performed for all the layers designated by the sequence, the process returns to step S907. After that, the same processing is performed until the processing is performed for all the layers in the sequence.

In step S909, the sequencer unit 104 determines whether all the secruences have ended. If not all the sequences have ended, the process returns to step S901 to continue the processing.

Figure 3:
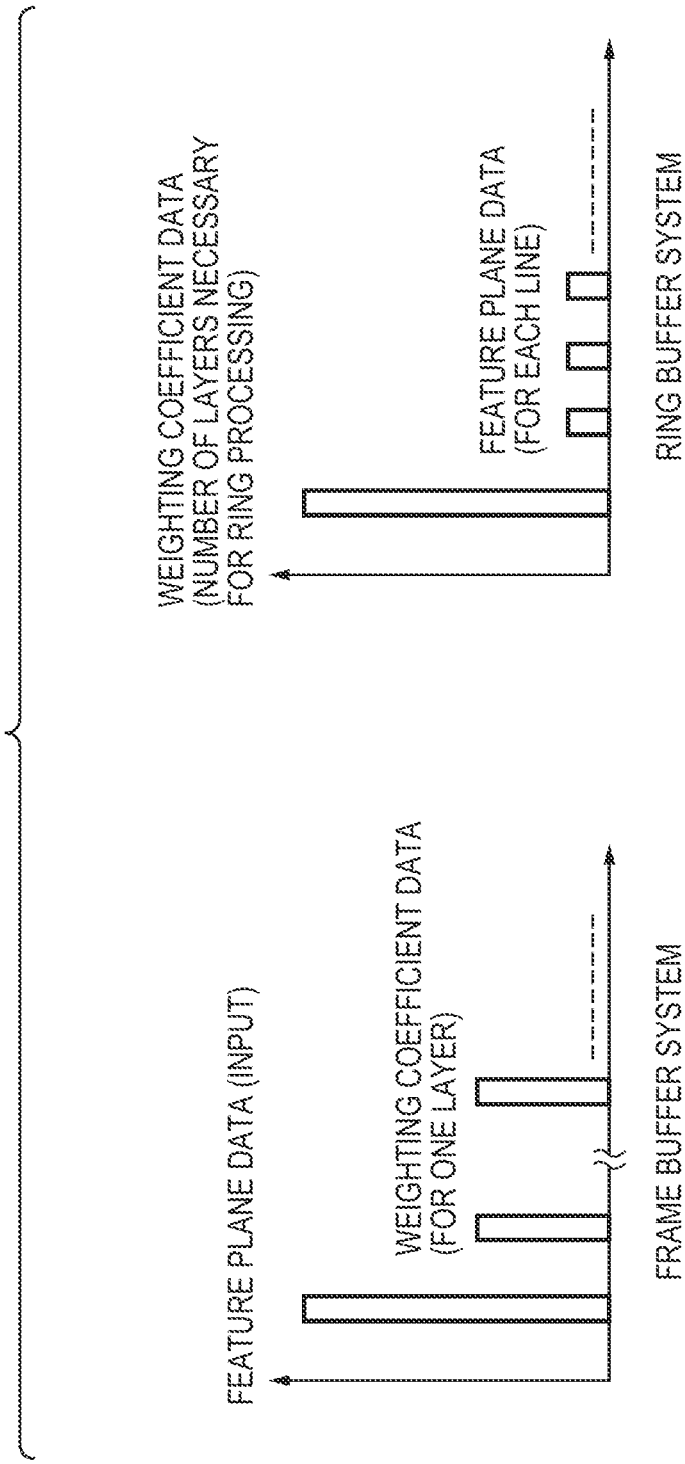
FIG. 3 shows timing charts respectively showing data transfer in ring buffer control and that in frame buffer control.

FIG. 3 shows timing charts respectively showing data transfer in ring buffer control and that in frame buffer control. More specifically, FIG. 3 shows timing charts each showing transfer of data supplied from another CPU 68. A timing chart 300*a* is that for the frame buffer system, and a timing chart 300*b* is that for the ring buffer system.

In the frame buffer system of the timing chart 300*a*, after input data is supplied, the necessary weighting coefficients of the filter kernels are sequentially supplied on a processing layer basis. In the ring buffer system of the timing chart 300*b*, data necessary for the ring buffer are supplied first, and then input data is transferred on a line basis.

In step S805, upon detecting the interrupt, the CPU 68 considers that CNN calculation in step S804 is complete, and performs output image acquisition processing. In this processing, the CPU 68 activates the DMAC 66, and transfers necessary calculation results from the CNN processing unit 63 to the RAM 70.

As described above, the processing is performed while switching the buffer control system for each layer. This makes it possible to execute a switching sequence in accordance with the layer structure, and execute CNN processing with a smaller memory capacity.

Figure 16B:
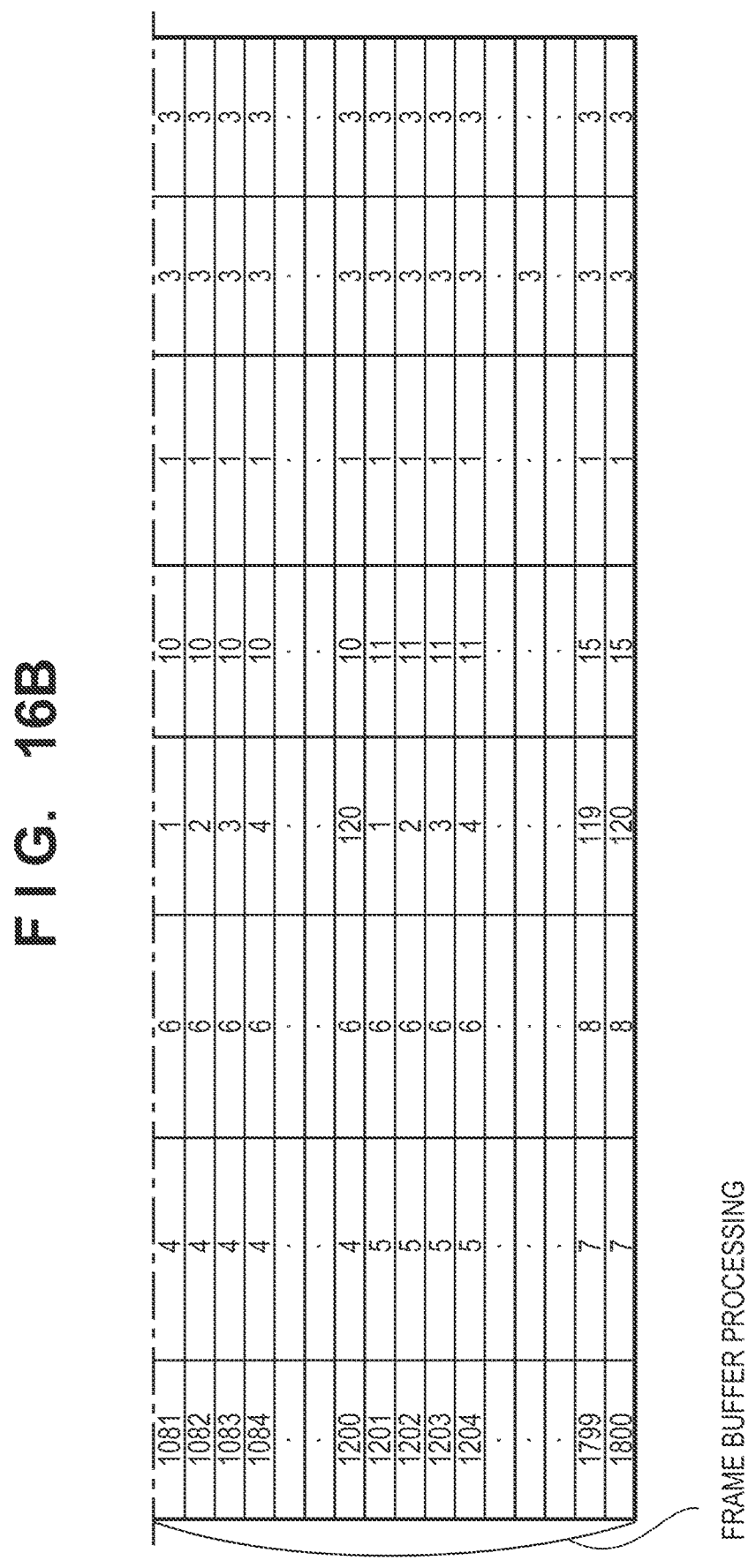

An operation when actually switching the buffer control system will be described. FIGS. 16A and 16B show a table showing an example of the sequence control information when switching the buffer control system. FIGS. 16A and 16B shows the sequence control information used when controlling layers 1401 to 1403 by ring buffer control and layers 1403 to 1405 by frame buffer control.

Processes in processing nodes in the layers 1401 to 1403 are the same as those in the 0th to fifth processing nodes in the sequence 1000*a*, and the processing is appropriately performed when feature planes (lines) necessary for processing in the next processing node are obtained. Therefore, for example, to obtain three lines of the first to third nodes in the sequence numbers "1" to "18", convolution calculation operations are performed for the 0th processing node using the weighting coefficients of the filter kernels of the three lines. The obtained results are used to perform processing of the first line of each of the fourth and fifth nodes in the sequence numbers "19" to "24". This line processing is performed appropriately.

In this example, a sequence number necessary to perform ring buffer control for the 0th to fifth processing nodes is "1080", and then the processing is immediately switched to processing by frame buffer control from the next secruence. Since frame buffer control assumes that input feature planes to be referred to are held by a frame, it is assumed that all the feature planes of the fourth and fifth processing nodes of the layer 1403 in which the frame processing is switched to the buffer processing are internally held. Next, frame buffer control is performed in the layers 1403 to 1405. In frame buffer control, processing is completed on a frame basis for each combination of processing nodes.

Between the layers 1404 and 1405, in sequence numbers "1081" to "1200", the feature plane of the fourth processing node is used as an input feature plane, and the feature plane of the sixth processing node is used as an output feature plane, thereby processing all the lines by a weighting coefficient number "10" of a filter kernel. Convolution calculation between the processing nodes is performed appropriately. After the lines of all the feature planes of the processing nodes in the layer 1404 are processed, the feature planes in the layer 1403 are not directly necessary to process feature planes in the layer 1405. Thus, the area for them is released and used as an area to hold the feature plane in the layer 1405. By ending all the sequences in a sequence number "1800" at last, the feature plane of the eighth processing node can be acquired.

<Effect>

A change in memory size by the above-described method will be described with reference to FIG. 17. FIG. 17 is a table showing estimate examples of a necessary memory size at the time of line buffer processing. Assume that the image size is QQVGA (that is, a height of 120 pixels). Note that for the sake of descriptive simplicity, convolution calculation is also performed for the edge portion of the image and the image size remains the same.

More specifically, FIG. 17 shows estimates when an image size (Feature map), a feature plane count (#Feature map), and a kernel size (Kernel size) in each layer have values described in the table.

As estimates for the line buffer system, a feature plane buffer size (Line: Feature map size) and a filter kernel buffer size (Line: Weight size (Sum from L1)) are shown. Furthermore, a buffer size (Line: Total size) as a total buffer size is shown.

As estimates for the frame buffer system, a feature plane buffer size (Frame: Feature map size) and a filter kernel buffer size (Frame: Weight size) are shown. Furthermore, a buffer size (Frame: Total size) as a total buffer size is shown.

As described above, in the line buffer processing, convolution calculation operations are sequentially performed by the weighting coefficients of the filter kernels over the layers, and thus all the weighting coefficients need to be internally held. The table has a hierarchical structure of layers L1 to L9, and the column of the filter kernel buffer size of the line buffer system indicates the total filter kernel buffer size (total memory size) when holding kernel sizes of the layers from the layer L1 to the corresponding layer. That is, when performing line buffer processing up to the layer L3, a filter kernel buffer size of 103.8 Kbytes (to be referred to as KB hereinafter) is required. Similarly, the column of the feature plane buffer size for the line buffer system indicates the total feature plane line buffer size when holding the kernel sizes of the layers from the layer L1 to the corresponding layer.

The total buffer size required when performing line buffer processing for all the layers of the network described in the table of FIG. 17 is 17,670.9 KB. Since, in frame buffer control, it is unnecessary to perform processing over the layers, the largest one of the buffer sizes necessary for processes for the respective layers is required. In this example, the largest size is 11,952.0 KB that is required to process the layer L5. When selecting one of the buffer processes, a memory size required when selecting frame buffer control is smaller.

Assume that line buffer processing is performed for the layers L1 to L5 and the internal buffer processing is switched to perform frame buffer control. In this case, a buffer size required until line buffer processing is performed for the layers L1 to L5 is 2,109.9 KB. When performing frame buffer control for the layers L6 to L9, a largest buffer size necessary to process the layer L8 or L9, that is, 3,504.0 KB is required. Therefore, processing can be performed with a buffer size of 5,613.9 KB in total. This can significantly reduce the buffer size, as compared to the method of selecting one of the buffer processes.

As described above, according to the first embodiment, the buffer control system is switched for each layer by changing the sequence and performing control in accordance with the sequence. By switching the buffer control system in accordance with the configuration of the processing target network, it is possible to reduce the memory size necessary for calculation.

Note that the CNN has been exemplified above. The present invention, however, is not limited to this. Although the example of processing an image has been explained above, the present invention is applicable to processing for multidimensional data.

Second Embodiment

In the second embodiment, a method of determining switching between the ring buffer system and the frame buffer system will be described.

<Calculation of Necessary Memory Size>

A method of calculating a memory size necessary for each system will be described. Consider the ring buffer system first. In ring buffer control, processing advances on a line basis in the overall CNN. All intermediate buffers basically need to exist at the same time. The following description will be provided by paying attention to convolution calculation, and a description of calculation such as sub-sampling of a feature amount will be omitted. The following parameters are used.

Total number of layers (except for input layer): A

Number of layers to be processed by target buffer system: N

Layer number variable (intermediate layer) by target buffer system: l=1, 2, . . . , N−1

Number of feature planes of each layer: $F_l$

Feature number (feature of interest of layer of interest): $f=f_l=1, \ldots, F_l$ Feature number of previous layer: $f'=f_{l-1}$ Input image size (horizontal direction, vertical direction): $I_x, I_y$ Kernel Size (horizontal direction, vertical direction): $W_x(l, f, f'), W_y(l, f, f')$ Height of ring buffer: $B_y(l, f)$ Necessary capacity of ring intermediate buffer: $S_B$ Necessary capacity of buffer holding weighting coefficients of filter kernels: $W_{b\_all}$ In this case, the total size $S_B$ required when allocating all the intermediate buffers as line buffers of the minimum size and the weighting coefficient $W_{all}$ of a filter kernel can be obtained by:

$$B_y(l, f) = \max(W_Y(l+1, f_{l+1}, f_l) | 1 \leq l \leq N-1, 1 \leq f_{l+1} \leq F_{l+1}) \quad (2)$$

$$S_B = I_x \times \sum_{l=1}^{N-1} \sum_{f=1}^{F_l} B_y(l, f)$$

$$W_{b\_all} = \sum_{l=1}^{N-1} \sum_{f=1}^{F_l} W_x(l, f, f') \times W_y(l, f, f')$$

That is, the size of the intermediate buffer necessary in the line buffer system is given by $S_B+W_{all}$.

In the above-described calculation, the size of the intermediate buffer necessary for each of all processing nodes forming network calculation is set as a data amount required by the processing node connected to the succeeding stage of the corresponding processing node. By totalizing the sizes of the intermediate buffers, a memory amount necessary for network calculation is calculated. Furthermore, as described above, in the line buffer system, calculation is performed over a plurality of layers. Thus, calculation is performed by assuming that all the weighting coefficients of the filter kernels are buffered.

Consider a memory capacity required for the frame buffer system next. As described in the first embodiment, in the frame buffer system, input feature planes necessary for processes between successive layers and output feature planes are held in the memory. When performing processing between next layers, the output feature planes obtained between the previous layers are used as input feature planes, and an area that holds the input feature planes between the previous layers can be released, and stores output feature plane data of the current layer. With respect to the weighting coefficients of the filter kernels, data necessary for processing between the layers can be held in the internal memory and processed. However, the weighting coefficients are sequentially loaded, and calculation related to the loaded weighting coefficients is performed on the spot, thereby further reducing the necessary memory size.

At this time, the necessary capacity $S_l$ of the frame intermediate buffer between layers and the necessary capacity $W_p$ of the buffer holding the weighting coefficients of the filter kernels can be obtained by:

$$S_l=(I_X \times I_Y) \times (F_l \times F_{l+1})$$

$$W_l=W_x(l, f, f') \times W_y(l, f, f') \times (F_l \times F_{l+1}) \quad (3)$$

In frame buffer control, with respect to the buffer size necessary for arithmetic processing between layers, the largest one of the sizes between target layers to undergo frame buffer processing suffices. Therefore, the buffer size necessary for the frame buffer processing is obtained by $\max(S_l+W_l)$.

It is possible to obtain the total necessary size when forming the intermediate buffers by frames (when adopting the frame buffer system). In this calculation processing, the total of the sizes of calculation result data generated by all the processing nodes belonging to a pair of successive layers in the network configuration is calculated for all the pairs, and the largest one of the total sizes is set as a necessary memory capacity. With respect to the weighting coefficients of the filter kernels, the largest one, in all the layers, of the weighting coefficients of the filter kernels necessary for feature plane calculation operations for respective feature planes generated between layers can be used. Therefore, the buffer size necessary for the frame buffer system is given by $S_p+W_{p\_all}$.

As is apparent from equations (2) and (3), the total necessary memory size changes depending on which of the ring buffer system and the frame buffer system is performed for each specific layer of the CNN layers. This depends on the connection structure of the logical processing nodes of the CNN network and the convolution kernel size of each node. A method of determining a layer in which the buffer control system is switched will be described blow.

<Method of Determining Switching Layer>

Figure 15:
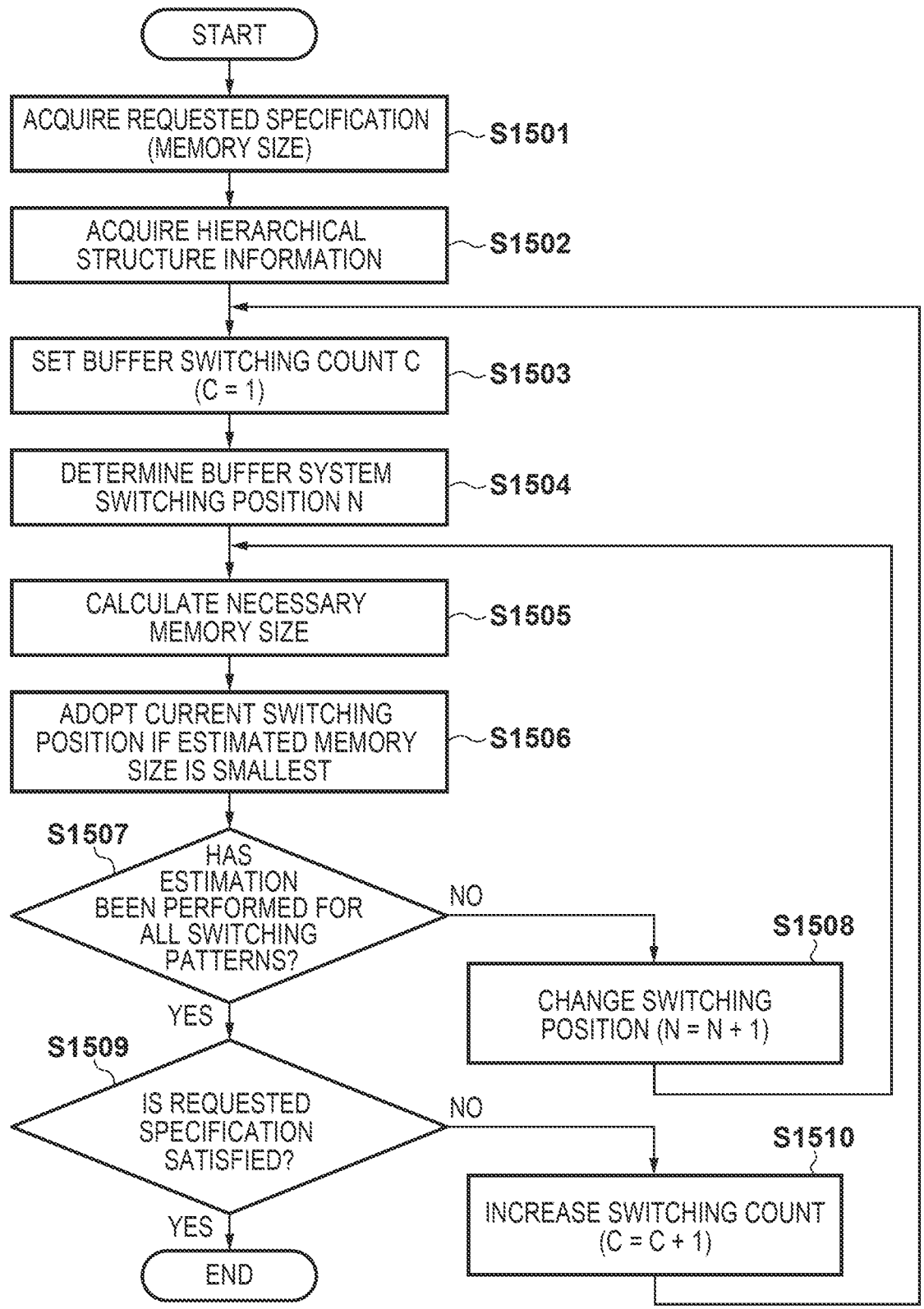
FIG. 15 is a flowchart for determining a buffer control system switching position.

FIG. 15 is a flowchart for determining a buffer control system switching position. This processing is executed by, for example, the CPU 68.

In step S1501, the CPU 68 acquires a requested specification. The requested specification indicates the maximum memory size that can be allowed by the user.

In step S1502, the CPU 68 acquires information about a target CNN hierarchical structure. The CNN hierarchical structure indicates basic information for determining the CNN hierarchical structure, such as the number of layers, the number of feature planes of each layer, an image size, and a kernel size.

Steps S1503 to S1508 are processes for actually determining a switching position. In step S1503, the CPU 68 sets a switching count C. In this example, the initial switching count is "1" by assuming that switching is performed. However, the present invention is not limited to this.

In step S1504, the CPU 68 determines a buffer system switching position N. Assume that the initial switching position is set between the first and second layers. However, the present invention is not limited to this. By exemplifying FIG. 14, a switching position is set between the layers 1402 and 1403.

In step S1505, the CPU 68 determines memory sizes necessary for the respective buffer systems by equations (2) and (3) for the previous and subsequent layers at the switching position, and calculates, as a necessary memory size, the larger one of the memory sizes given by equations (2) and (3).

In step S1506, if the necessary memory size estimated at the current switching position is smaller than the smallest one of the necessary memory sizes calculated so far, the CPU 68 adopts the current switching position. This means that the smallest one of necessary memory sizes obtained in accordance with different switching positions or switching counts (to be described later) is selected.

In step S1507, the CPU 68 confirms for the switching count C whether estimation has been performed for all possible switching patterns. If estimation has not been performed for all the switching patterns, the switching position is changed in step S1508 to repeat steps S1505 to S1507. On the other hand, if estimation has been performed for all the patterns, it is determined in step S1509 whether the memory size as the requested specification is satisfied. If the memory size is not satisfied, the switching count is increased in step S1510 to repeat steps S1503 to S1509; otherwise, the process ends.

As described above, according to the second embodiment, it is possible to determine the position of the more preferable switching laver.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (NPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2017-040919, filed Mar. 3, 2017 which is hereby incorporated by reference herein in its entirety.

What ts claimed is:

1. An arithmetic processing apparatus for executing processing using a hierarchical type network in which a plurality of processing nodes are provided in a plurality of layers, the apparatus comprising:
   one or more processors; and
   one or more memories coupled to the one or more processors, the one or more memories having stored thereon instructions which, when executed by the one or more processors, cause the apparatus to:
   store a parameter used by each of the plurality of processing nodes for arithmetic processing and a calculation result of the arithmetic processing in each of the plurality of processing nodes, in the one or more memories; and
   set, in advance of storing the calculation result, a buffer for storing the calculation result in the one or more memories in accordance with a line buffer system for a front group of layers and in accordance with a frame buffer system for a back group of layers in the plurality of layers of the hierarchical type network, where the front group of layers includes a leading layer and can include one or more layers succeeding to the leading layer and the back group of layers follows the front group of layers and includes one or more successive layers in the plurality of layers,
   wherein in setting the buffer, a line buffer is allocated for each layer of the front group of layers with setting a size of the line buffer based on a circular number of a ring buffer for using the line buffer as the ring buffer, and a frame buffer is allocated with setting a size of the frame buffer based on a number of lines of one frame for each layer of the back group of layers.

2. The apparatus according to claim 1, wherein the plurality of layers of the hierarchical type network are separated into the front group of layers and the back group of layers based on a necessary memory size for each group in a configuration of the hierarchical type network.

3. The apparatus according to claim 2, wherein, as the necessary memory size, a total memory size of a first memory size required to store the parameter in the one or more memories and a second memory size required to store the calculation result in the one or more memories is obtained.

4. The apparatus according to claim 1, wherein the instructions, when executed by the one or more processors, further cause the apparatus to:
   generate sequence control information for controlling the plurality of processing nodes in accordance with respective buffer systems set for the front group of layers and the back group of layers; and
   cause the plurality of processing nodes to execute arithmetic processing based on the sequence control information.

5. The apparatus according to claim 1, wherein the hierarchical type network is CNN (Convolutional Neural Networks).

6. The apparatus according to claim 5, wherein the arithmetic processing is convolution filter calculation processing for an image.

7. The apparatus according to claim 2, wherein the configuration includes at least one of the number of layers of the plurality of layers, the number of feature planes in each layer, an image size in each layer, and a kernel size in each layer.

8. The apparatus according to claim 1, wherein the plurality of processing nodes are logical processing nodes, and are implemented by a single physical processing node.

9. The apparatus according to claim 6, wherein the calculation result is data of a feature plane representing a feature of an image by using, as a feature amount, a result of convolution filter calculation processing for each pixel, and the parameter is a filter kernel coefficient.

10. The apparatus according to claim 1, wherein the parameter is changed along with switching of the buffer system.

11. The apparatus according to claim 6, wherein in a subsequent layer of the plurality of layers of the hierarchical type network, identification processing is performed for data of a feature plane obtained by the convolution filter calculation processing.

12. The apparatus according to claim 1, wherein the instructions, when executed by the one or more processors, further cause the apparatus to:
hold an operation status of the buffer, and
set a physical address of the buffer on a memory.

13. A control method for an arithmetic processing apparatus for executing processing using a hierarchical type network in which a plurality of processing nodes are provided in a plurality of layers, the arithmetic processing apparatus including one or more memories for storing a parameter used by each of the plurality of processing nodes for arithmetic processing and a calculation result of the arithmetic processing in each of the plurality of processing nodes, the method comprising:
setting, in advance of storing the calculation result, a buffer for storing the calculation result in the one or more memories in accordance with a line buffer system for a front group of layers and in accordance with a frame buffer system for a back group of layers in the plurality of layers of the hierarchical type network, where the front group of layers with setting a size of the line buffer based on a circular number of a ring buffer for using the line buffer as the ring buffer, includes a leading layer and can include one or more layers succeeding to the leading layer and the back group of layers follows the front group of layers and includes one or more successive layers in the plurality of layers; and
wherein in setting the buffer, a buffer is allocated for each layer of the front group of layers and a frame buffer is allocated with setting a size of the frame buffer based on a number of lines of one frame for each layer of the back group of layers.

14. A non-transitory computer-readable recording medium storing a program that causes a computer to perform a control method for an arithmetic processing apparatus for executing processing using a hierarchical type network in which a plurality of processing nodes are provided in a plurality of layers, the arithmetic processing apparatus including one or more memories for storing a parameter used by each of the plurality of processing nodes for arithmetic processing and a calculation result of the arithmetic processing in each of the plurality of processing nodes, the method comprising:
setting, in advance of storing the calculation result, a buffer for storing the calculation result in the one or more memories in accordance with a line buffer system for a front group of layers and in accordance with a frame buffer system for a back group of layers in the plurality of layers of the hierarchical type network, where the front group of layers with setting a size of the line buffer based on a circular number of a ring buffer for using the line buffer as the ring buffer, includes a leading layer and can include one or more layers succeeding to the leading layer and the back group of layers follows the front group of layers and includes one or more successive layers in the plurality of layers; and
wherein in setting the buffer, a buffer is allocated for each layer of the front group of layers and a frame buffer is allocated with setting a size of the frame buffer based on a number of lines of one frame for each layer of the back group of layers.

\* \* \* \* \*